US006981792B2

(12) United States Patent
Nagakubo et al.

(10) Patent No.: US 6,981,792 B2
(45) Date of Patent: Jan. 3, 2006

(54) BACKLIGHT DEVICE AND LIQUID CRYSTAL DISPLAY DEVICE

(75) Inventors: Hideaki Nagakubo, Fukushima-ken (JP); Koichi Yamamoto, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 72 days.

(21) Appl. No.: 10/727,269

(22) Filed: Dec. 3, 2003

(65) Prior Publication Data
US 2004/0125592 A1 Jul. 1, 2004

(30) Foreign Application Priority Data
Dec. 6, 2002 (JP) .............................. 2002-355747

(51) Int. Cl.
*F21V 7/04* (2006.01)

(52) U.S. Cl. ..................... 362/600; 362/26; 362/27; 362/615

(58) Field of Classification Search ................ 362/600, 362/26, 27, 615, 31; 349/62, 64, 65, 67, 349/70; 385/146
See application file for complete search history.

(56) References Cited

U.S. PATENT DOCUMENTS

| 5,600,462 | A | * | 2/1997 | Suzuki et al. | ................ 349/112 |
| 5,626,800 | A |  | 5/1997 | Williams et al. | |
| 6,592,233 | B1 | * | 7/2003 | Parikka | ....................... 362/31 |
| 6,612,723 | B2 | * | 9/2003 | Futhey et al. | ................ 362/339 |
| 6,636,283 | B2 | * | 10/2003 | Sasagawa et al. | ............. 349/65 |
| 6,761,461 | B2 | * | 7/2004 | Mizutani et al. | ............... 362/31 |
| 6,835,440 | B1 | * | 12/2004 | Konishi et al. | .............. 428/156 |

FOREIGN PATENT DOCUMENTS

JP   2000-011728   1/2000

* cited by examiner

*Primary Examiner*—John Anthony Ward
*Assistant Examiner*—Mark Tsidulko
(74) *Attorney, Agent, or Firm*—Brinks Hofer Gilson & Lione

(57) ABSTRACT

A backlight device 10 wherein a light source 13 and a light guide plate 12 for introducing light components from the light source 13 from the incident surface 12a provided on an end surface to emit the light from the surface 12b are included, a plurality of the wedge-shaped grooves 12e are formed on the surface 12b of the light guide plate 12 in stripes in plan view, and micro-irregularities 12g are formed between adjacent wedge-shaped grooves 12e is disclosed. A liquid crystal display device 1 having the backlight device 10 formed on the back surface of the liquid crystal display unit 20 is disclosed.

12 Claims, 16 Drawing Sheets

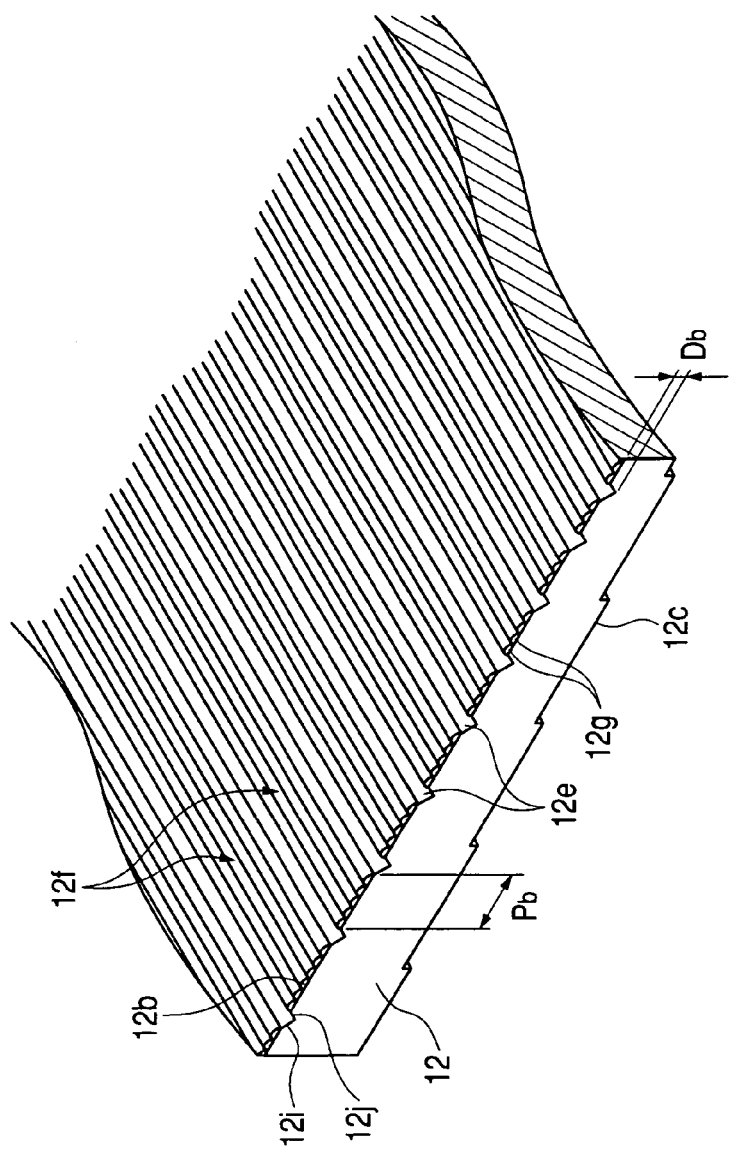
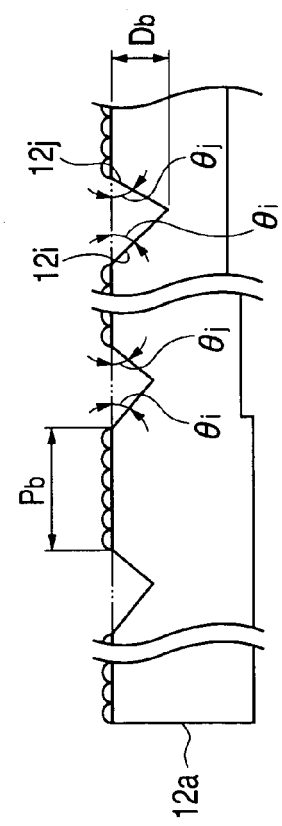
FIG. 2A
FIG. 2B

ND LIQUID
BACKLIGHT DEVICE AND LIQUID CRYSTAL DISPLAY DEVICE

This application claims the benefit of priority to Japanese Patent Application No. 2002-355747, herein incorporated by reference.

BACKGROUND OF THE INVENTION

1. Field of the Invention

The present invention relates to a backlight device being suitable for backlight for a liquid crystal display device and a liquid crystal display device having the same.

2. Description of the Related Art

FIG. 24 is a schematic cross sectional view showing an example of a conventional passive-type (a simple matrix type) liquid crystal display device. The liquid crystal display device 300 according to this example comprises a transmissive or transflective liquid crystal display unit 320 and a backlight device 310 disposed on the back surface of the liquid crystal display unit 320 (refer to Patent Documents 1 and 2).

The backlight device 310 is configured so that the light from an elongate light source 313 such as a Cold Cathode Florescent Lamp (CCFL) is introduced to an incident surface 312a (side surface) of the flat light guide plate 312 and is emitted from an emitting surface 312b (upper surface) of the light guide plate 312 facing the liquid crystal display unit 320.

The surface (lower surface) 312c opposite to the emitting surface 312b of the light guide plate 312 has a light reflectivity by forming a reflecting member 317 having a dot-shaped flat pattern or a number of white or reflective protrusions thereon.

A diffusion plate 314 is provided on the emitting surface 312b of the light guide plate 312, and two prism sheets 315, 316 are provided on the diffusion plate 314 in this order, thereby applying the light diffusivity, the uniformity of brightness distribution, and the light directivity. As shown in FIG. 25, each prism sheet is formed by forming a series of protrusions 318 having triangular sections and a series of grooves 319 having wedge-shaped, sections on a layer formed on a substrate. The two prism sheets 315, 316 are positioned such that the extended direction of the ridgelines of the protrusions 318 in one prism sheet is perpendicular to those of the protrusions 318 in the other prism sheet (the prisms are perpendicular to each other). Light component in a certain direction among light components emitted from the emitting surface 312b of the light guide plate 312 is transmitted through the prism sheet 315, is focused at a viewing angle having a certain angle range (for example, up to 70°); and is emitted as an emitted light component L21. Light components, in different directions are transmitted through the prism sheet 316, is focused at a viewing angle having a certain angle range (for example, up to 70°), and emitted as an emitted light component L22.

Recently, it has been suggested that a white LED (Light Emitting Diode) which is a point light source be employed as a light source of the backlight device.

[Patent Document 1]
Japanese Unexamined Patent Application Publication No. 11-500071 (corresponding U.S. Pat. No. 5,626,800)
[Patent Document 2]
Japanese Unexamined Patent Application Publication No. 2000-11728

However, the conventional backlight device 310 comprises the diffusion plate 314 and the two prism sheets 315, 316 which are provided separately from the light guide plate on the light guide plate 312. Therefore, there are problems in that the number of components increase, the structure thereof becomes complicated, and the thickness and cost thereof increases.

In addition, in the prior art, a cheap thin backlight device which can uniformly and brightly illuminate the display area of the liquid crystal display unit 320 cannot be realize.

Further, since the conventional liquid crystal display device 300 comprises the above-mentioned backlight device 310, the thickness of the entire device increases and the cost thereof increase.

SUMMARY OF THE INVENTION

Accordingly, embodiments of the present invention provide a cheap thin backlight device of which the number of components is reduced and the structure is simple, and an illumination area is uniformly and brightly illuminated.

Also, embodiments of the present invention provide a cheap thin liquid crystal display device having a high brightness and an excellent display quality which comprises the above-mentioned backlight device.

The backlight device related to the present invention comprises a light source, and a light guiding plate for introducing light from the light source from an incident surface formed on the end surface to emit the light from a surface thereof. The surface of the light guide plate has a plurality of wedge-shaped grooves formed in a stripe in a plan view and a light diffusion surface having micro-protrusions formed between adjacent wedge-shaped grooves are formed.

According to the backlight device of the present invention, since the light guide plate can use the reflected light component as well as the transmitted light component as the illumination light among the light components incident on the wedge-shaped grooves, the light emitted from the light source to the light guiding plate can be efficiently used as the illumination light, the loss of the light can be reduced, and the illumination area can be uniformly and brightly illuminated.

Particularly, among the light components emitted from the light source and incident on, the light guide plate, the light components incident on the wedge-shaped groove at a certain angle are split into a light component (transmitted light component) which is emitted to the outside of the light guide plate to be used as the illumination light, and another light component (reflected light component) which is reflected to be emitted to another surface of the light guide plate. The reflected light component is reflected from the light diffusion sheet or the diffusive reflector provided on the other surface, is introduced onto the light diffusion surface or the wedge-shaped grooves at an incident angle different from an initial incident angle, in order to be used as the illumination light. The light incident on the light diffusion surface is diffused and emitted to the outside of the light guide plate so as to be used as the illumination light, and the light components incident on the wedge-shaped groove again are split into the transmitted light component and the reflected light component. And, the reflected light component is reflected from the light diffusion sheet or the diffusive reflector as mentioned above and is capable of being used as the illumination light.

Also, in the light components reflected at the wedge-shaped grooves, the light components may be reflected without transmitting another surface of the light guide plate, and then the reflected light components are introduced into the light diffusion surface or the wedge-shaped grooves again, thereby being used as the illumination light.

Further, in the light components incident on the light guide plate, the light components may be introduced into another surface without being introduced into the wedge-shaped grooves, and such light components are diffused and emitted to the outside of the light guide plate, thereby being used as the illumination light.

In addition, in the light incident on the light guide plate, light components may be incident on the other surface without being introduced into the wedge-shaped grooves, and the light components may be reflected from the light diffusion sheet or the diffusive reflector provided on the other surface or reflected from another surface, and then the reflected light components are introduced into the wedge-shaped grooves, thereby being used as the illumination light.

According to the backlight device of the present invention, since one light guide plate has both a light guiding function for guiding the light emitted from the light source to emit from the emitting surface of the light guide plate and a diffusion function for diffusing the light emitted from the emitting surface, the present invention reduces the number of components as compared with the conventional backlight device provided with a diffusion plate separated from the light guide plate, thereby the structure thereof may be made simply and thin and the manufacturing cost thereof may be reduced.

The light guide plate included in the backlight device of the present invention can be manufactured by an injection molding method.

In addition, in the backlight device of the present invention, it is preferable that the extended direction of the wedge-shaped grooves formed in the surface of the light guide plate is parallel to the incident surface of the light guide plate.

Also, in the backlight device of the present invention, it is preferable that the extended direction of the micro-protrusions formed in one surface of the light guide plate be parallel to the incident surface of the light guide plate or be perpendicular to the incident surface of the light guide plate.

In addition, in the backlight device of the present invention, it is preferable that a depth $D_b$ of the wedge-shaped grooves formed in the surface of the light guide plate and/or a distance $P_b$ between adjacent wedge-shaped grooves vary in accordance with the distance from the light source or the brightness distribution of the in-plane direction of the light guide plate.

For example, in the backlight device of the present invention, it is preferable that the depth $D_b$ of the wedge-shaped grooves far from the light source be deeper than that of the wedge-shaped grooves close to the light source or the distance $P_b$ between adjacent wedge-shaped grooves far from the light source be shorter than that between adjacent wedge-shaped grooves close to the light source.

In addition, in the backlight device of the present invention, it is preferable that a diffusive reflector having micro-irregularities having light reflectivity formed on a base surface be formed such that the micro-irregularities-formed surface is opposite to another surface of the light guide plate.

In the above-mentioned backlight device, although the light emitted from the light source to the light guide plate is emitted to the outside of the light guide plate at the other surface thereof, the emitted light is reflected and introduced onto the light guide plate again, thereby reducing the loss of the light and improving the emitting efficiency thereof. Also, the light is diffused by the micro-irregularities of the diffusive reflector, thereby improving the uniformity of the emitted light.

In addition, in the backlight device of the present invention, it is preferable that a light directivity adjusting sheet having a plurality of pyramid-shaped bodies formed on a base body be formed on the surface of the light guide plate such that tips of the pyramid-shaped bodies are directed to the opposite direction to the light guide plate. The light directivity adjusting sheet may control the directivities of the transmitted light components in at least two different directions among the light components emitted from the surface of the light guide plate and transmitted through the light directivity adjusting sheet.

In the above-mentioned backlight device, since the directivity of the transmitted light components in at least two different directions among the light components emitted from the emitted surface of the light guide plate is controlled by using the light directivity adjusting sheet, the light is focused at an angle suitable for the illumination of the object and the light which does not distribute to the illumination of the object (wasted light component) is little so that the illumination area can be uniformly and brightly illuminated. Also, in the backlight device, since one light directivity adjusting sheet can control the directivity of the transmitted light component in at least two different directions among the light components emitted from the emitted surface of the light guide plate, it is possible to reduce the number of components, as compared with the conventional backlight device having two prism sheets, thereby the structure thereof can be made simply and thin and the manufacturing cost thereof can be reduced.

In the backlight device of the present invention, it preferable that micro-irregularities having light diffusivity are formed on the surface of the light directivity adjusting sheet facing the light guide plate.

According to the above-mentioned backlight device, the light components emitted from the emitted surface of the light guide plate are diffused by the micro-irregularities provided on the surface of the light directivity adjusting sheet facing the light guide plate, the uniformity of the emitted light components can be further improved, without increasing the number of components.

In addition, in the backlight device of the present invention, it is preferable that the thickness of the light guide plate far from the light source be thinner than that of the light guide plate close to the light source.

Further, in the backlight device of the present invention, the light source may comprise an elongate light source such as CCFL, or a point light source such as EL (Electroluminescence) or LED (Light Emitting Diode).

In addition, the light source may comprise a middle light guide body arranged along the end surface of the light guide plate and a point light source arranged in the end surface of the longitudinal direction of the middle light guide body.

The liquid crystal display device of the present invention comprises the above-mentioned backlight device and a liquid crystal display unit illuminated at the back surface by the backlight device.

The liquid crystal display device of the present invention comprises the backlight device on the back surface of the liquid crystal display unit. Accordingly, it can uniformly and brightly illuminate the display area (illuminated area), and good visibility, high brightness and excellent display quality can be obtained. In addition, since the number of components can be reduced, the thin liquid crystal display device can be manufactured at low cost.

BRIEF DESCRIPTION OF THE DRAWINGS

FIG. 2 illustrates a light guide plate of backlight device included in the liquid crystal display device of the first embodiment, wherein FIG. 2A is a partial enlarged perspective view of the light guide plate, and FIG. 2B is a partial enlarged cross sectional view of the light guide plate;

FIG. 14 shows a concave portion of a second example of the diffusive reflector included in a backlight device related to the present invention in which

FIG. 16 shows a concave portion of a third example of the diffusive reflector included in a backlight device related to the present invention in which

DESCRIPTION OF THE PREFERRED EMBODIMENTS

Hereinafter, the embodiments of the present invention will be explained with reference to the accompanying drawings. However, the present invention is not limited to the following embodiments.

(First Embodiment)

Figure 1:
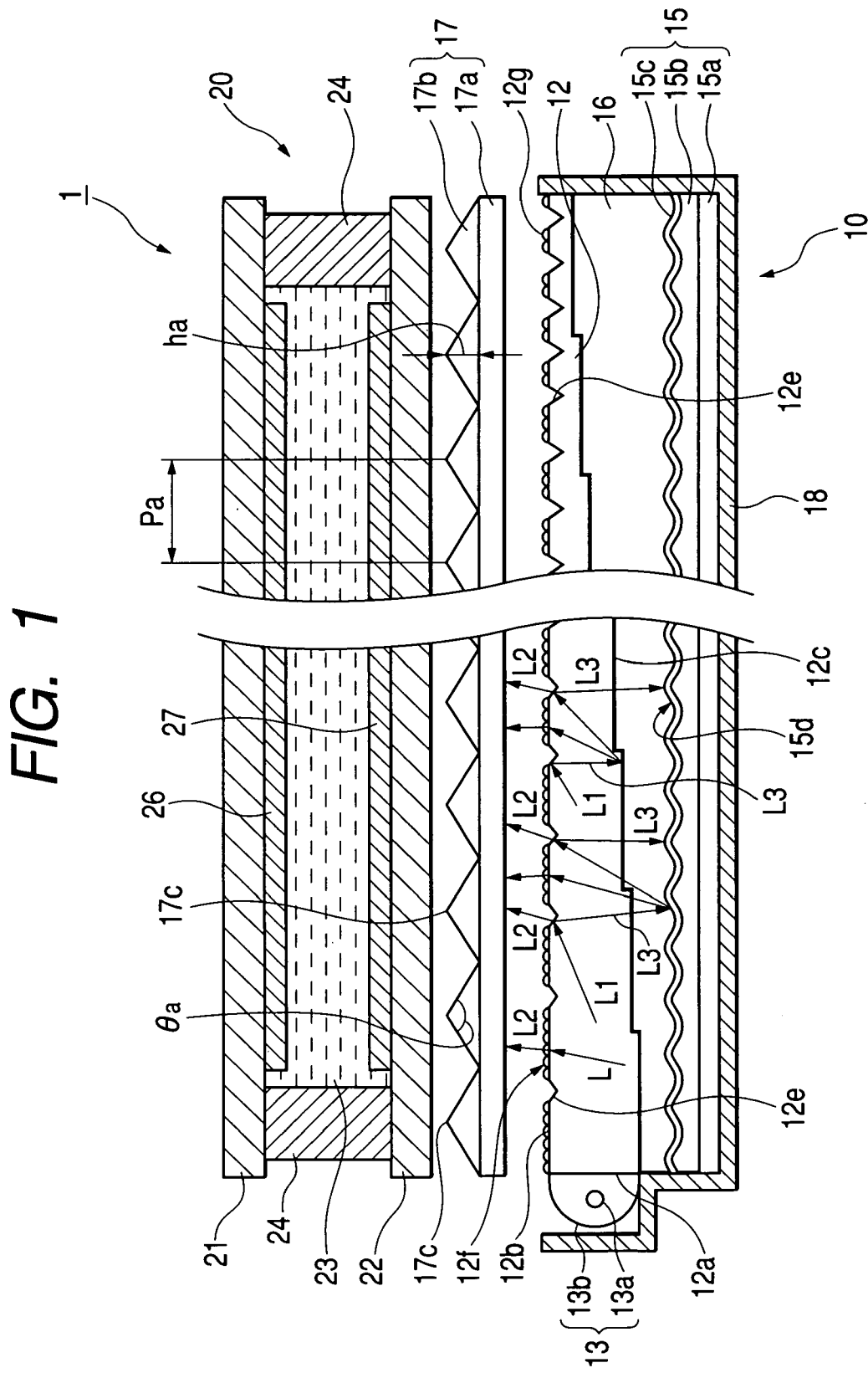
FIG. 1 is a cross sectional view illustrating a liquid crystal display device according to a first embodiment of the present invention.

FIG. 1 is a cross sectional view of a liquid crystal display device having a backlight device (a back irradiating device) according to a first embodiment of the present invention.

The liquid crystal display device 1 according to this embodiment comprises a liquid crystal display unit 20, and a backlight device 10 positioned at the back surface of the liquid crystal display unit 20 for illuminating the liquid crystal display unit 20 at the back surface thereof.

The liquid crystal display unit 20 is a transmissive type and comprises a first substrate 21 and a second substrate 22 which are attached to each other as one body by sealing material 24. The first substrate 21 and the second substrate 22 are made of glass and face each other with a liquid crystal layer 23 sandwiched therebetween. Display circuits 26, 27 are formed on the liquid crystal layers 23 of the first substrate 21 and the second substrate 22, respectively.

The display circuits 26 and 27 include an electrode layer (not shown) composed of a transparent conductive film for driving the liquid crystal layer 23 and an alignment film for controlling the orientation of the liquid crystal layer 23. In addition, if necessary, the display circuits 26 and 27 may include color filters for displaying color images.

The backlight device 10 comprises a transparent light guide plate 12, a light source 13, a diffusive reflector 15, a light directivity adjusting sheet 17, and a holding member 18. In the backlight device 10, the light source 13 is provided on the end surface 12a for introducing the light into the light guide plate 12, the diffusive reflector 15 is provided on the opposite surface (lower surface, one surface) of the emitting surface (upper surface, the other surface) 12b of the light guide plate 12 by an air layer 16 sandwiched therebetween. The light directivity adjusting sheet 17 is provided on the emitting surface 12b of the light guide plate 12.

FIG. 2A is a partial enlarged perspective view of the light guide plate 12, and the FIG. 2B is a partial enlarged cross sectional view of the light guide plate 12.

The light guide plate 12 is positioned on the back surface (lower surface in Figure) of the display area of the liquid crystal display unit 20, irradiates the light emitted from the light source 13 to the liquid crystal display unit 20, and is composed of a flat transparent acrylic resin layer. As shown in FIG. 2, one end surface 12a (hereinafter, also referred to as an incident surface 12a) of the light guide plate 12 is provided with the light source 13, the light emitted from the light source 13 is introduced into the light guide plate 12 through the incident surface 12a. The upper surface (the surface at the side of the liquid crystal display unit 20) of the light guide plate 12 is an emitting surface (one surface) 12b.

The light guide plate 12 is made of transparent resin material such as polycarbonate resin or epoxy resin, or glass in addition to acrylic resin. Also, concretely, for example, Arton (made by JSR corporation) or Zeonor (made by Zeon Corporation) can be used, but it is not limited to those types.

The emitting surface 12b of the light guide plate 12 is the surface which is positioned toward the liquid crystal display unit 20 and which emits the light for illuminating the liquid crystal display unit 20.

As shown in FIG. 2, the upper surface 12b of the light guide plate 12 is formed with a plurality of grooves 12e, each of which has a wedge shape in the cross sectional view and is arranged in stripes in the plan view. The extended direction of the wedge-shape grooves 12e is parallel to the incident surface 12a of the light guide plate 12. In addition, a light diffusion surface 12f is formed between adjacent wedge-shaped grooves 12e on the upper surface 12b of the light-guide surface 12. Each light diffusion surface 12f has one or a plurality of micro-protrusions (micro-convex shape) 12g. The micro-protrusions 12g are formed along the extended direction of the wedge-shaped groove 12e.

The thickness of the light guide plate 12 is about 0.6 mm to 1.5 mm, and preferably about 0.8 mm to 1.2 mm.

Between two oblique surfaces forming the wedge-shaped grooves 12 (at light source side), the inclination angle·θi of one oblique surface 12i is in the range of 40 to 50°, and the inclination angle θj of the other oblique surface 12j is in the order of 40 to 80°.

The depth $D_b$ of the wedge-shaped grooves 12e is in the range of 5 μm to 100 μm.

The distance (pitch) $P_b$ between adjacent wedge-shaped grooves 12e is in the range of 100 μm to 300 μm, and preferably 200 μm to 250 μm.

It is preferable that the depth $D_b$ of the wedge-shaped grooves 12e and/or the distance (pitch) $P_b$ between adjacent wedge-shaped grooves 12e vary according to the distance from the light source 13 or the brightness distribution of the in-plane direction of the light guide plate 12.

In this embodiment, the depth $D_b$ of the wedge-shaped grooves 12e is gradually increased as the distance from the light source 13 is long: that is, the depth of the wedge-shaped grooves 12e far from the light source 13 is larger than that of the wedge-shaped grooves 12e close to the light source 13. Also, the distance $P_b$ between adjacent wedge-shaped grooves 12e is gradually decreased as the distance from the light source 13 is long: that is, the distance between adjacent wedge-shaped grooves 12e far from the light source 13 is smaller than the distance between wedge-shaped grooves 12e close to the light source 13.

Further, a step is formed on the surface (the other surface of the light guide plate) 12c opposite to the emitting surface 12b of the light guide plate 12, the thickness of the light guide plate is gradually reduced as the distance from the light source 13 is long: that is, the thickness of the light guide plate far from the light source 13 is thinner than that of the light guide plate 12 close to the light source 13, thereby obtaining the above-mentioned effect.

The above-mentioned light guide plate 12 can be manufactured by using an injection molding method.

The light source 13 comprises an elongate cold cathode tube 13a, and a reflection plate 13b located around the cold cathode tube 13a. The reflection plate 13b reflects light emitted from the cold cathode tube 13a toward the incident surface of the light guide plate 12, for efficiently introducing the light emitted from the cold cathode tube 13a onto the light guide plate 12.

(First Example of the Diffusive Reflector)

Figure 3:
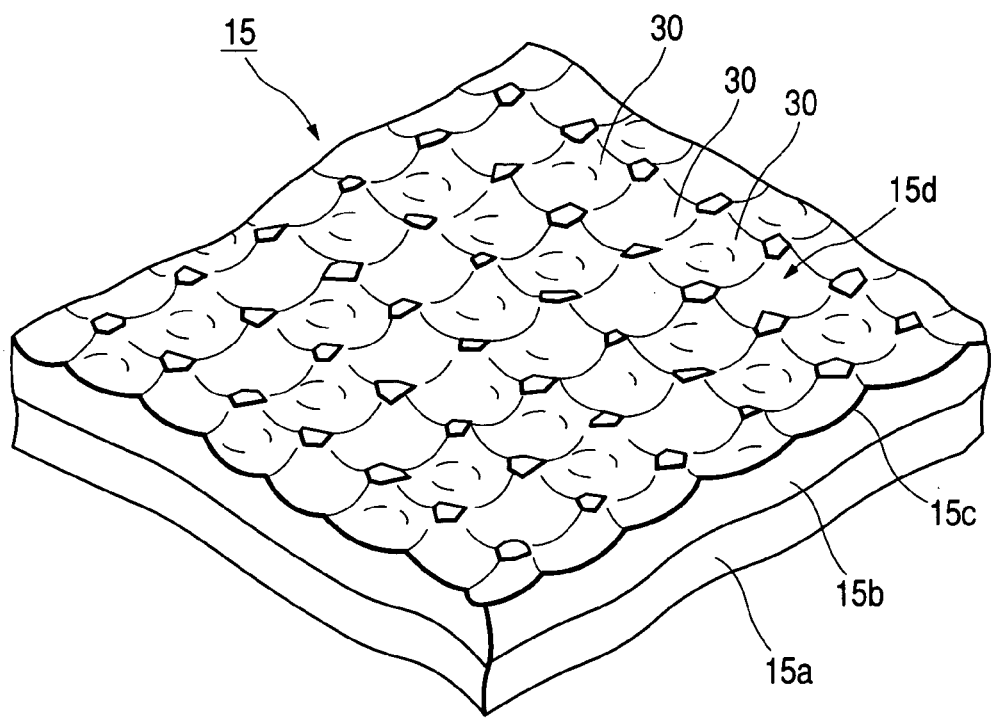
FIG. 3 is a partial enlarged perspective view of a diffusive reflector of the backlight device included in the liquid crystal display device according to the first embodiment.
Figure 4:
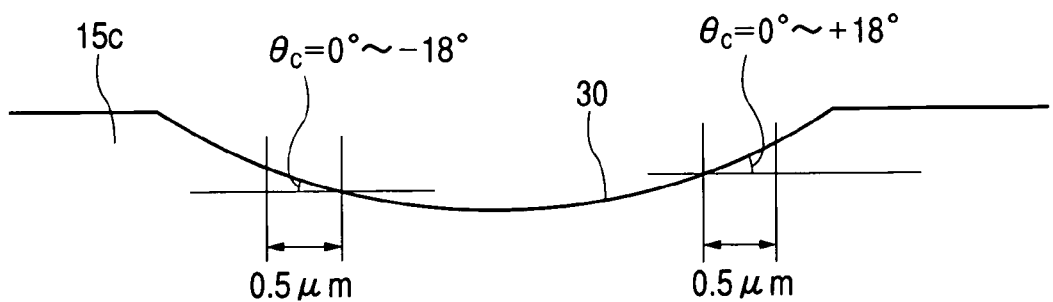
FIG. 4 is a cross sectional view of a concave portion of the diffusive reflector in FIG. 3.

FIG. 3 is a partial enlarged perspective view of a diffusive reflector 15 (a first example of the diffusive reflector), and FIG. 4 is a cross sectional view of a concave portion of the diffusive reflector in FIG. 3.

The diffusive reflector 15 comprises micro-irregularities 15d having light reflectivity provided on the base surface. The micro-irregularities 15d have a plurality of concave portions 30.

In this embodiment, the base comprises a substrate 15a, an organic film 15b consisting of acrylic resin formed on the substrate 15a, and a reflection film 15c consisting of a metal film having high reflectivity and formed on the surface of the organic film 15b.

The organic film 15b can be formed by forming a resin layer consisting of a photoresist on the substrate 15a consisting of a film or a thin plate such as Polyethylene terephthalate (PET), Polycarbonate, or acryl in a flat shape, pressing a transcription mold consisting of acrylic resin having a surface shape of irregularities reverse to that of the organic film 15b to be obtained, on the surface of the resin layer, and curing the resin layer. Then, the reflection film 15c is formed on the organic film 15b with the concave portions thereon in the above-mentioned manner. The reflection film 15c can be formed by depositing metal material having high reflectivity such as aluminum or silver by using a sputtering method or a vacuum deposition method.

The substrate 15a may be stripped after forming the reflection film 15c. In this case, the base of the diffusive reflector 15 consists of the organic film 15b and the reflection film 15c.

The diffusive reflector 15 is provided such that the surface having the micro-irregularities 15d (micro-irregularities formed surface) is directed to the lower surface 12c of the light guide plate 12.

The reflection characteristics of the diffusive reflector 15 can be controlled by changing the inner shape of the plurality of concave portions 30 formed on the surface of the reflection film 15c.

In this embodiment, it is preferable that the concave portion 30 be randomly formed such that the depth thereof is in the range of 0.1 μm to 3 μm, the pitch between adjacent concave portions 30 is in the range of 5 μm to 100 μm, and the inclination angle of the inner surface of the concave portion 30 is in the range −18° to +18°.

Also, in this specification, 'depth of the concave portion' means the distance from the surface (the surface of the base) of the reflection film 15c (at the portion that the concave portion) is not formed to the bottom of the concave portion, and 'the pitch between adjacent concave portions' means the distance between the centers of the circular concave portions in the plan view. Also, 'inclination angle of the inner surface of the concave portion' is the angle $θ_c$ of the oblique surface with respect to the horizontal surface (the base surface) within the very small range when taking a very small range of 0.5 μm width at any portion in the inner surface of the concave portions 30, as shown in FIG. 4. In the positive and the negative of the angle $θ_c$, the right oblique surface in FIG. 4 is the positive and the left oblique surface is the negative, with respect to the normal line of the surface (the base surface) of the reflection film 15c in which the concave portions are not formed.

In this embodiment, it is important that the inclination angle distribution of the inner surface of the concave portion 30 be set in the range of −18° to +18° and that the pitch between adjacent concave portions 30 be randomly arranged with respect to the overall plane. This reason is that the interference color of the light is emitted such that the reflected light has a color if the pitch between adjacent concave portions has regularity. In addition, another reason is that the diffusion angle of the reflected light becomes excessively wide such that the reflection strength is degraded and bright display can not be obtained (the diffusion angle of the reflected light becomes 55° or more in air) if the inclination-angle distribution of the inner surface of the concave portion 30 exceeds the range of −18° to +18°.

Further, if the depth of the concave portion 30 is less than 0.1 μm, the light diffusion effect can not sufficiently be obtained by forming the concave portion on the reflection surface, and, if the depth of the concave portion 30 is more than 3 μm, the pitch must be large in order to obtain the sufficient light diffusion effect. Otherwise, there is a problem in that a Moire pattern may be generated.

In addition, in a case where the pitch between adjacent concave portions 30 is less than 5 μm, there is a limit in the manufacturing of the transcription mold used in forming the organic film 15b, the manufacturing time becomes extremely long, the shape being capable of obtaining desired reflection characteristics may not be formed, and the interference light may be generated. Also, the transcription mold for forming the surface shape of the organic film 15b is manufactured by transcribing a prototypic surface shape made by pressing a plurality of diamond pressers to the base such as stainless steel into silicon resin. Because the diameter of the front end of the diamond presser is preferably 30 μm to 200 μm, it is preferable that the pitch between concave portions 30 is 5 μm to 100 μm.

Figure 5:
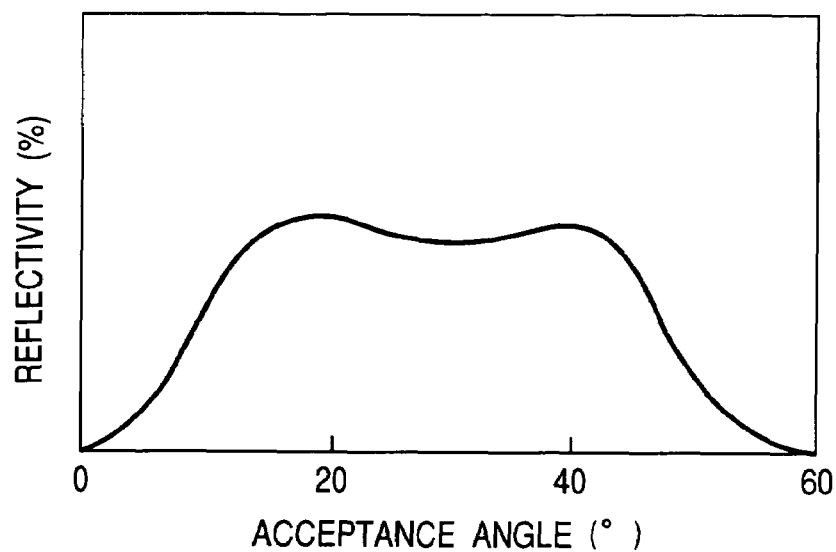
FIG. 5 is a graph illustrating an example of reflection characteristics of the diffusive reflector having the concave portion shown in FIG. 4.

FIG. 5 illustrates the relationship between an acceptance angle (unit: °) and the brightness (reflectivity, unit: %) when irradiating the light on the reflection surface (base surface) of the diffusive reflector 15 used in this embodiment at an incident angle of 30° and moving the acceptance angle from the vertical line location (0°; normal line direction) to 60°, centering on 30° which is the specular direction with respect to the reflection surface (base surface). As shown in this Figure, the substantially uniform reflectivity can be obtained in the wide light receiving range, centering on the specular direction.

This is because the depth or the pitch of the concave portion 30 shown in FIG. 4 is controlled in the abovementioned range and the inner surface of the concave portion 30 is spherical. That is, because the inclination angle of the inner surface of the concave portion 30 controlling the reflection angle of the light is controlled in a certain range by controlling the depth and the pitch of the concave portion 30, it is possible to control the reflection efficiency of the reflection film 15c within a certain range. In addition, because the inner surface of the concave portion 30 has a sphere shape that is symmetric with respect to the overall direction, the uniform reflectivity can be obtained at the wide reflection direction of the reflection film 15c.

Figure 6:
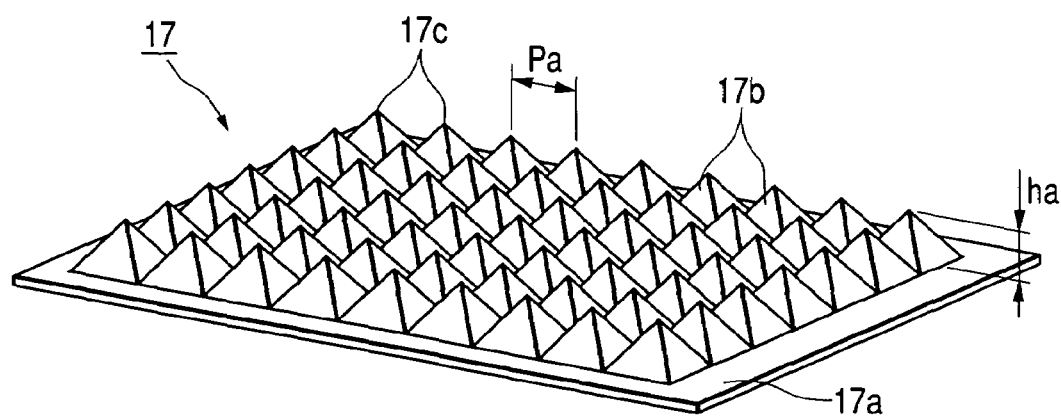
FIG. 6 is a partial enlarged perspective view of a light directivity adjusting sheet of the backlight device included in the liquid crystal display device according to the first embodiment.

FIG. 6 is a partial enlarged perspective view of a light directivity adjusting sheet 17.

The light directivity adjusting sheet 17 can adjust directivities of the transmitted light component in at least two different directions among the light components emitted from the emitting surface 12b of the light guide plate 12 and transmitted through the light directivity adjusting sheet 17. The light directivity adjusting sheet 17 is manufactured by forming a plurality of quadrangular pyramids (pyramid-shaped bodies) 17b composed of acrylic resin or polycarbonate on a base body 17a composed of a Polyester film or a PET film. The light directivity adjusting sheet 17 is provided so that the tips 17c of the quadrangular pyramids 17b are directed to the direction opposite the light guide plate 12 (the side of the liquid crystal display unit 20).

The thickness of the light directivity adjusting sheet 17 is in the range of 150 μm to 300 μm.

The angle θa of the tip of each quadrangular pyramid 17b is in the range of 70° to 110°, and preferably in the range of 80° to 100°. If the angle θa is less than 70°, the use efficiency of the light is degraded or the uniformity thereof is decreased, and, if the angle θa is more than 110°, the directivity thereof is deteriorated.

The pitch Pa between adjacent head portions 17c, 17c is in the range of about 30 μm to 100 μm, and preferably in the range of about 50 μm to 80 μm. If the pitch Pa is less than 30 μm, the use efficiency of the light is degraded, and, if the pitch Pa is more than 100 μm, it is difficult to obtain the uniform illumination.

It is preferable that the arrangement of the plurality of the quadrangular pyramid 17b formed on the base body 17a be an arrangement according to the distance from the light source 13 (according to the distribution of the light from the light source 13) or an arrangement according to the distribution of brightness of the in-plane direction of the light guide plate 12 (the distribution of brightness at the emitting surface 12b). For example, the pitch Pa and/or the height ha of the quadrangular pyramid 17b varies according to the distance from the light source 13a or according to the distribution of brightness of the in-plane direction of the light guide plate 12, and, particularly, the pitch Pa of the quadrangular pyramid 17b at the location far from the light source 13 is smaller (denser) than that of the quadrangular pyramid at the location close to the light source 13. In addition, the height ha of the quadrangular pyramid 17b at the location far from the light source 13 is larger (higher) than that of the quadrangular pyramid at the location close to the light source 13. Thereby, the in-plane deviation of the directivity characteristics and the in-plane deviation of the brightness can be reduced.

The inner side of a holding member 18 has diffusion reflectivity, and the holding member 18 surrounds and accommodates the light guide plate 12, the light source 13, and the diffusive reflector 15 in a package to hold integrally the light guide plate 12, the light source 13, and the diffusive reflector 15.

In the liquid crystal display device 1 of this embodiment, the transmissive-type liquid crystal display can be formed by lighting the backlight device 10 provided on the back surface of the liquid crystal display unit 20.

Concretely, the light emitted from the light source 13 of the backlight device 10 and introduced into the light guide plate 12 through the incident surface 12a of the light guide plate 12 is reflected from the inner surface of the light guide plate 12 to be propagated in the inside thereof. Among the light components propagated in the light guide plate 12, the light components L1 incident on the wedge-shaped grooves 12e are herein split into transmitted light components L2 and reflected light components L3. The transmitted light components L2 are emitted from the upper surface (emitting surface) 12b to the outside of the light guide plate. The reflected light components L3 are emitted from the lower surfaces 12c of the light guide plate 12, are diffused and reflected at the surface of the diffusive reflector 15, and are introduced into the light guide plate 12 again to be introduced into the light diffusion surfaces 12f or be introduced into the wedge-shaped grooves 12e at an incident angle different from an initial incident angle. And, the light components incident on the light diffusion surface 12f are diffused and emitted to the outside of the light guide plate as the transmitted light components L2, and the light components incident on the wedge-shaped grooves 12e again are split into the transmitted light components L2 and the reflected light components L3. The transmitted light components L2 are emitted from the upper surfaces (emitting surface) 12b to outside of the light guide plate. The reflected light components L3 are diffused and reflected at the surface the diffusive reflector 15 such that it can be used as the illumination light.

Also, among the light components L3 reflected at the wedge-shaped grooves 12e, the light components may be reflected at the lower surface 12e of the light guide plate 12, and the reflected light components are introduced into the light diffusion surfaces 12f or introduced into the wedge-shaped grooves 12e again so that it is can be used as the illumination light.

In addition, among the light components incident on the light guide plate, the light components L may be introduced into the light diffusion surfaces 12f without being introduced into the wedge-shaped grooves 12e, and the light components L may be diffused and emitted to the outside of the light guide plate as the transmitted light components L2.

Further, the respective light components L2 emitted from the emitting surface 12b of the light guide plate 12 are transmitted through the light directivity adjusting sheet 17 such that the direction thereof is controlled, is focused on the illumination area of the liquid crystal display unit 20 (area to be illuminated) by a preferable angle to illuminate the liquid crystal display unit 20 (specially, display area) at the side of the back surface.

In this way, by illuminating the liquid crystal display unit at the back surface thereof, the display of the liquid crystal display unit 20 can be viewed by a user.

Since the backlight device 10 in the this embodiment can use the reflected light components as well as the transmitted light among the light components incident on the wedge-shaped grooves 12 as the illumination light, light components emitted into the light guide plate from the light source 3 can be used as an illumination light with high efficiency, the loss of the light can be reduced, the display area of the liquid crystal display unit 20 can be uniform and brightly illuminated.

In addition, since one light guide plate 12 has a light guiding function for guiding the light emitted from the light source 13 to emit from the emitting surface 12b of the light guide plate 12 and a diffusion function for diffusing the light emitted from the emitting surface 12b, the present invention reduce the number of components as compared with those of the conventional backlight device provided with a diffusion plate separated from the light guide plate, thereby the structure thereof can be made simply and thin and the manufacturing cost thereof can be reduced.

In addition, although the light emitted to the light guide plate 12 from the light source 13 is emitted from the outside of the light guide plate at the lower surface of the light guide plate 12 by way of the diffusive reflector 15 having the above-mentioned structure on the lower surface of the light guide plate 12, the loss of the light can be reduced to improve the emitting efficiency at the backlight device, since the emitted light is reflected by the micro-irregularities 15d of the diffusive reflector 15 to be introduced into the light guide plate 15 again. Also, since the light is diffused by the micro-irregularities 15d of the diffusive reflector 15, the uniformity of the emitted light is improved.

Further, by providing the light directivity adjusting sheet 17 having the above-mentioned structure on the upper surface of the light guide plate 12, the number of components can be reduced as compared with those of the conventional backlight device provided with two prism sheets, thereby the structure thereof can be made simply and thin and the manufacturing cost thereof can be reduced. For example, the backlight device 10 of 1.2 mm or less in thick can be manufactured, and the liquid crystal display device 1 can be made thin.

Also, the liquid crystal display device 1 of this embodiment comprises the backlight device 10 on the back surface of the liquid crystal display unit as mentioned above. Accordingly, because the display area of the liquid crystal display unit 20 can be uniformly and brightly illuminated, high brightness, good visibility, and excellent display quality can be obtained. In addition, since the number of components is small, it can be thinly manufactured at low cost.

Further, in the liquid crystal display device 1 of this embodiment, in case where the circumferential light such as sun light or illuminated light is sufficiently bright, the circumferential light is reflected by the diffusive reflector 15 of the backlight device 10 even when the backlight device 10 is not switched on. Accordingly, the reflective liquid crystal display can be formed by using the reflection light.

Concretely, the circumferential light of the liquid crystal display device 1 reaches the diffusive reflector 15 through the light guide plate 12 of the backlight device 10 and the liquid crystal display unit 20, and the liquid crystal display unit 20 is illuminated from the back surface thereof by the light reflected at the surface of the reflection film 15c, thereby the display of the liquid crystal display unit 20 can be viewed by the user.

Further, since the reflection surface of the diffusive reflector 15 is formed in the above-mentioned shape, shining is prevented. Also, since the range of the reflection angle in the diffusive reflector 15 is wide and the uniformity thereof is good, the liquid crystal display device having a wide viewing angle and a bright display screen can be obtained.

Figure 7:
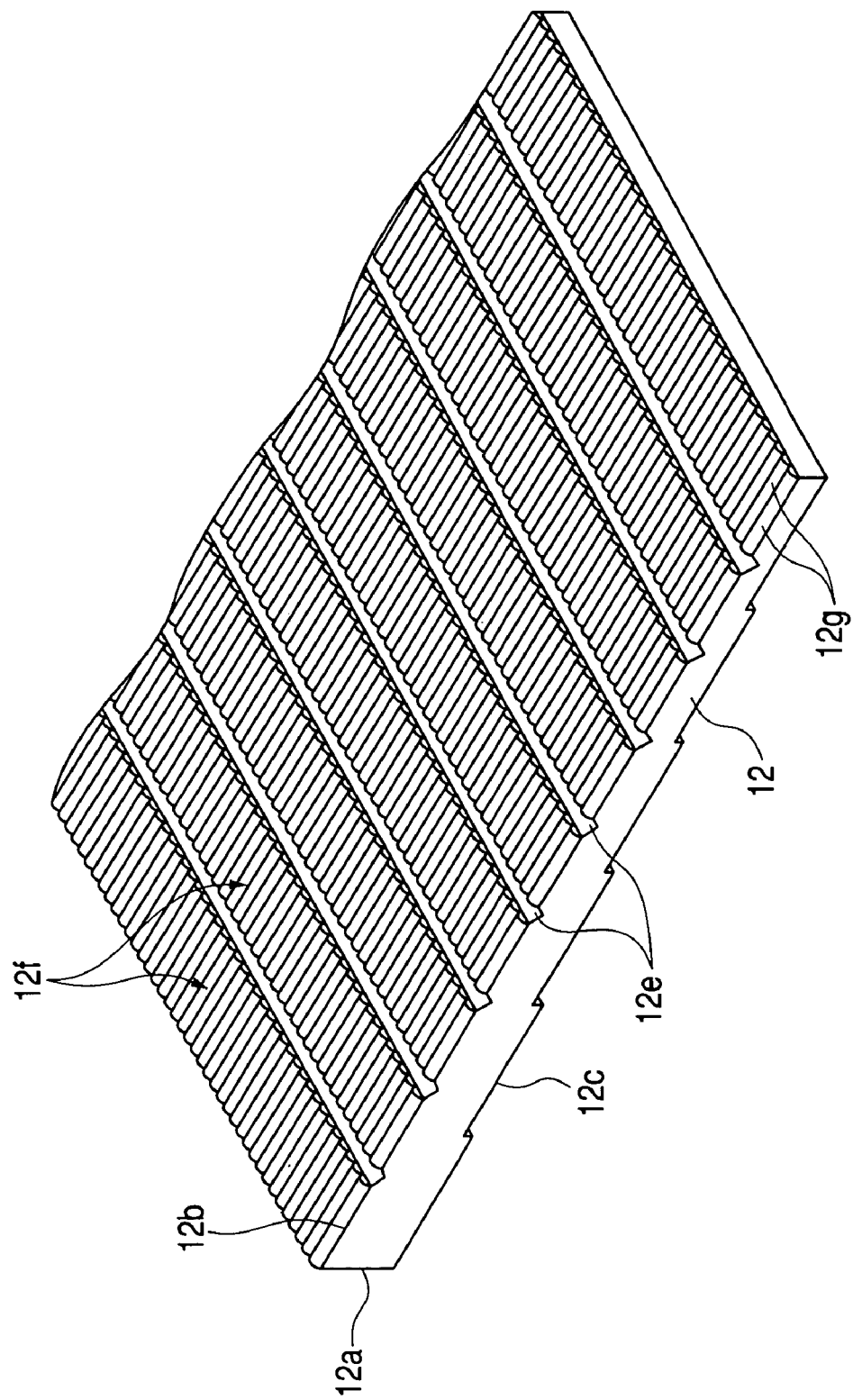
FIG. 7 is a partial enlarged perspective view of the light guide plate of another example of the backlight device included in the liquid crystal display device according to the first embodiment.
Figure 8:
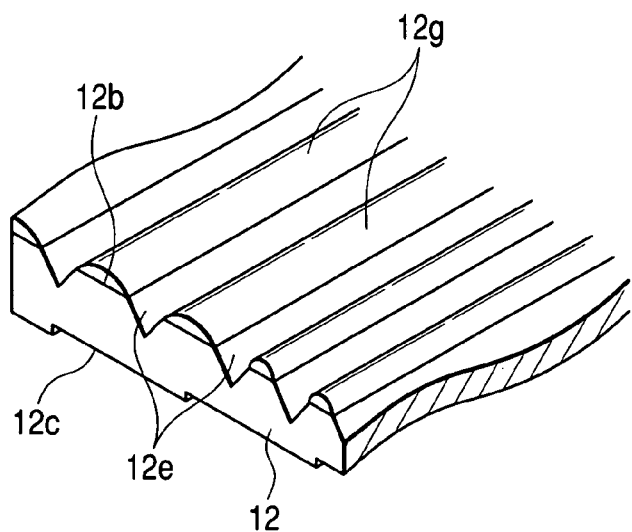
FIG. 8 is a partial enlarged perspective view of the light guide plate of another example of the backlight device included in the liquid crystal display device according to the first embodiment.

In addition, in above-mentioned embodiment, although the a case in which the extended direction of the micro-protrusions 12g formed on the light guide plate 12 included in the backlight device 10 is parallel to the incident surface 12a of the light guide plate 12 is described, it may be perpendicular to the incident surface 12a of the light guide plate 12, as shown in FIG. 7. Also, although a case that the light diffusion surfaces 12f between wedge-shaped grooves 12e formed on the light guide plate 12 have at least one micro-protrusion 12g is described, the respective light diffusion surface 12f may have micro-protrusions 12g having semi-circular shape in one cross sectional view, as shown in FIG. 8.

Figure 9:
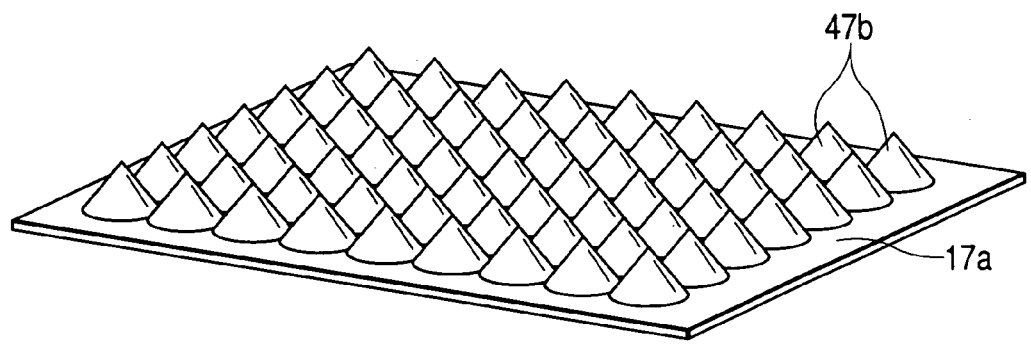
FIG. 9 is a partial enlarged perspective view of the light directivity adjusting sheet of another example included in the backlight device related to the present invention.

Further, although a case in which pyramid-shaped bodies formed on the base body 17a of the light directivity adjusting sheet 17 included in the backlight device 10 are quadrangular-pyramid 17b is described, the pyramid-shaped body is not limited to quadrangular-pyramid. That is, it may be a hexagonal pyramid or an octagonal pyramid, or it may be a circular cone 47b or an elliptical cone, as shown in FIG. 9.

Figure 10:
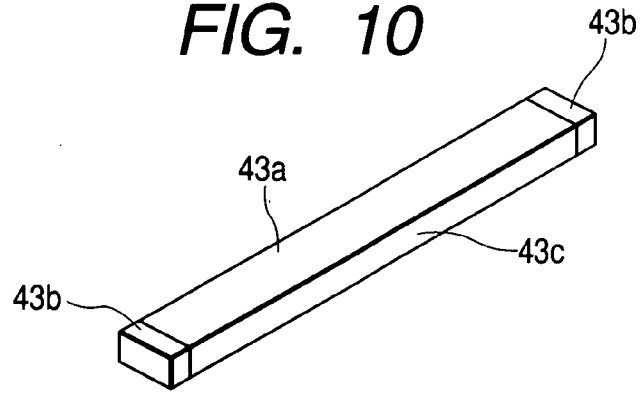
FIG. 10 is a perspective view of another example of a light source included in the backlight device related to the present invention.

Also, in this embodiment, although a case in which the light source 13 included in the backlight device 10 comprises the cold cathode tube 13a and the reflection plate 13b is described, a point light source such as a distribution-type EL or LED may be used as the light source, or the light source composed of a rectangular-pillar-shaped middle light guide body 43a composed of acrylic resin or polycarbonate resin and LED emitting devices 43b, 43b positioned on the both ends in the longitudinal direction of the middle light guide body 43a may be used, as shown in FIG. 10. Accordingly, it is not specially limited to that, if it can uniformly irradiate the light to the incident surfaces 12a of the light guide plate 12.

One side 43c of the middle light guide body 43a in FIG. 10 is arranged along the incident surface 12a of the light guide plate 12, and the opposite side is provided with a prism surface. The light introduced into the middle light guide body from the light emitting elements 43b, 43b is reflected at the prism surface and the carried direction thereof is changed to the light guide plate 12, thereby efficiently irradiating the light from the light emitting elements 13b, 13b on the incident surface 12a of the light guide plate 12.

Figure 11:
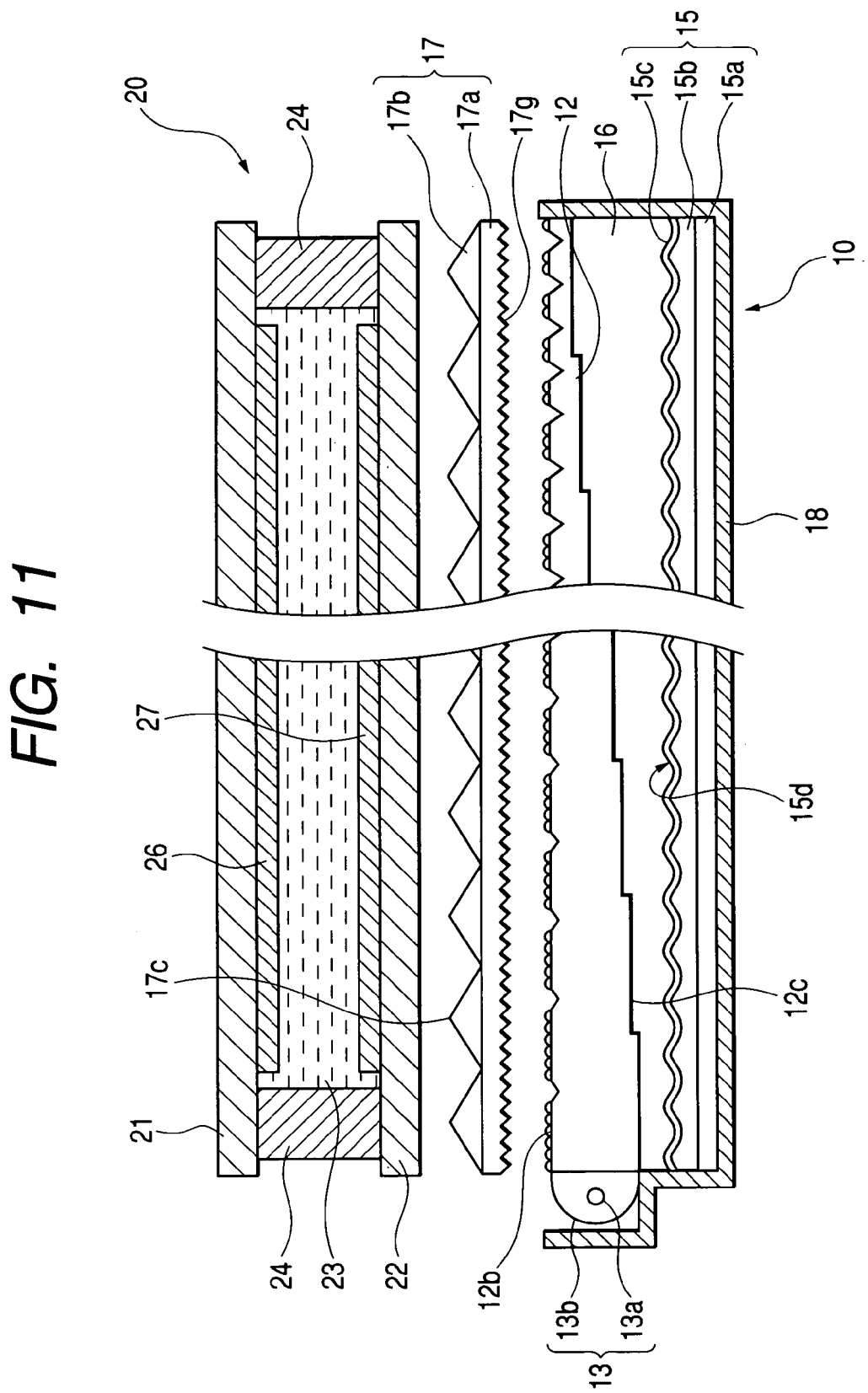
FIG. 11 is a cross sectional view of another example of the liquid crystal display device related to the present invention.

Also, in the backlight device 10 of this embodiment, since the diffusive reflector 15 or the light diffusion surface 12f formed on the light guide plate 12 has light diffusivity, the diffusion plate used in the conventional backlight device need not be provided. However, as shown in FIG. 11, micro-irregularities 17g having light diffusivity may be formed on the lower surface (the surface of the light guide plate side) of the light directivity adjusting sheet 17. The micro-irregularities 17g can be formed by using a sand blast or embossing process on the lower surface of the base body 17a of the light directivity adjusting sheet 17. In a case where the micro-irregularities 17g are formed as mentioned above, since the light emitted from the emitting surface of the light guide plate 12 is diffused by the micro-irregularities 17g, the uniformity of the emitted light can be further improved, without increasing the number of components.

(Second Embodiment)

Figure 12:
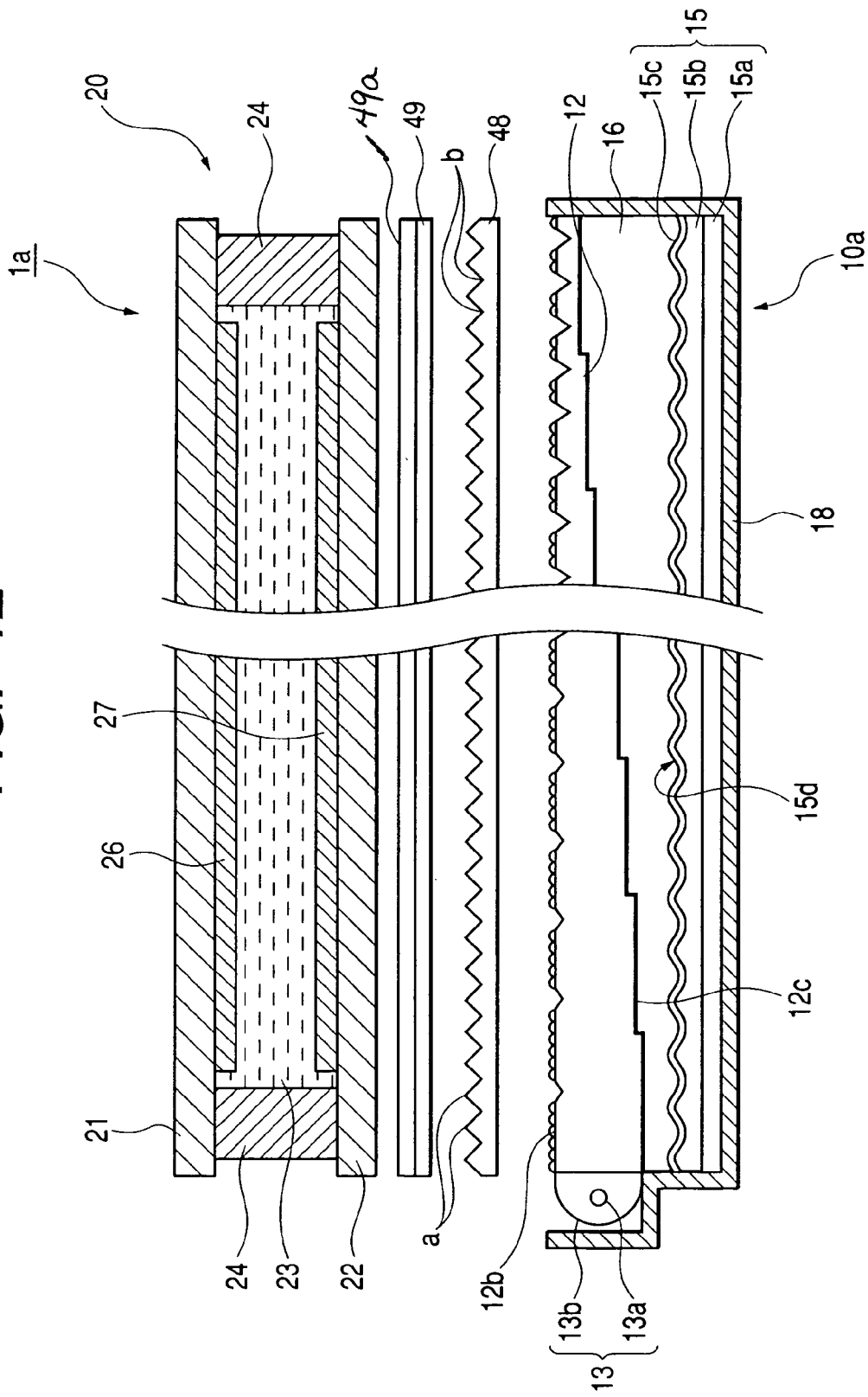
FIG. 12 is a cross sectional view of the liquid crystal display device according to a second embodiment of the present invention.

Next, the liquid crystal display device according to the second embodiment of the present invention will be explained with reference to FIG. 12. FIG. 12 is a cross sectional view of the liquid crystal display device according to the second embodiment.

The liquid crystal display device 1a according to the second embodiment is different from the liquid crystal display device 1 according to the first embodiment in the structure of the backlight device. That is, the backlight device 10a of this embodiment is provided with two prism sheets 48, 49 on the emitting surface 12b of the light guide plate 12. Since this embodiment has the same structure as the backlight device 10 of the first embodiment except for the above-mentioned structure, hereinafter, the detailed description thereof will be omitted. Also, since the basic structure of the liquid crystal display unit 20 is equal to that of the liquid crystal display unit shown in FIG. 1, the detailed description thereof will be omitted.

As shown in FIG. 12, the respective prism sheets comprise a series of triangular protrusions a and a series of wedge-shaped grooves b formed on the layer formed on the substrate. The two prism sheets 48, 49 are arranged such that the extended direction of the ridgelines of the protrusions a of one prism sheet is perpendicular to that of the other prism sheet (the prisms are orthogonal to each other) 49a, and among the light components emitted from the emitting surface 12b of the light guide plate 12, the light components in a certain direction are transmitted through one prism sheet 48, are focused at a viewing angle having any angular range, and are emitted as the emitting light. In addition, the light components in another direction are transmitted through the other prism sheet 49, are focused at the viewing angle having any angular range to be emitted as the emitting light.

In the backlight device 10a of this embodiment, since the light guide plate 12 serves to both guide light and diffuse light, the liquid crystal display unit 20 is uniformly and brightly illuminated, the number of components can be reduced, the structure thereof can be made simply and thin, and the manufacturing cost thereof can be reduced.

Also, since the liquid crystal display device 1a of this embodiment comprises the backlight device 10a on the back surface of the liquid crystal display unit 20, high brightness and excellent display quality can be obtained. In addition, a thin liquid crystal display device can be manufactured at low cost.

(Third Embodiment)

Figure 13:
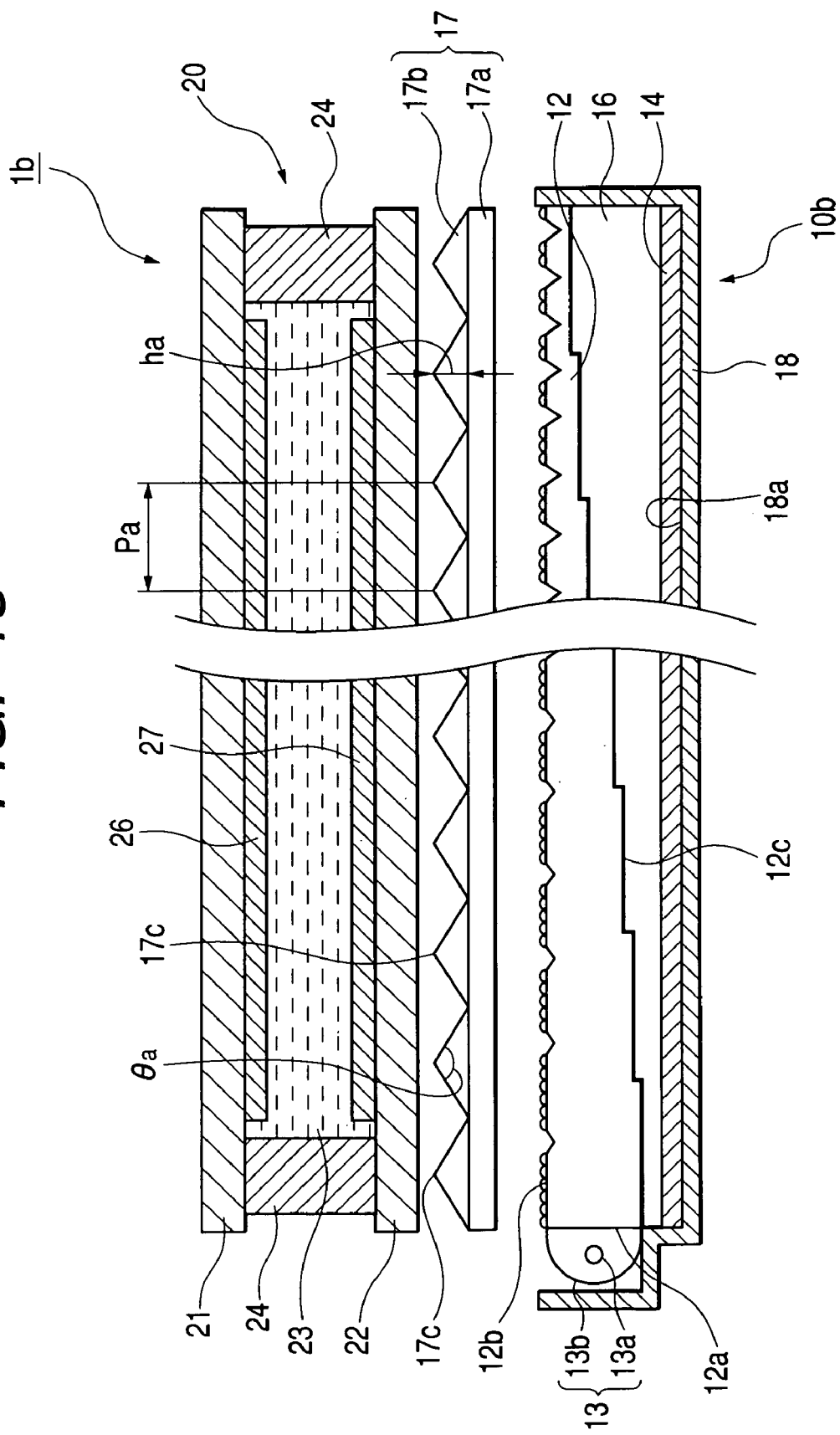
FIG. 13 is a cross sectional view of the liquid crystal display device according to a third embodiment of the present invention.

Next, the liquid crystal display device according to the third embodiment of the present invention will be explained with reference to FIG. 13. FIG. 13 is a cross sectional view of the liquid crystal display device according to the third embodiment.

The liquid crystal display device 1b according to the third embodiment is different from the liquid crystal display device 1 according to the first embodiment in the structure of the backlight device. That is, the backlight device 10b of this embodiment is provided with a light diffusion sheet 14 on the lower surface of the light guide plate 12, instead of the diffusive reflector 15. Since this embodiment has the same structure as the backlight device 10 of the first embodiment except for the above-mentioned structure, hereinafter, the detailed description thereof will be omitted. Also, since the basic structure of the liquid crystal display unit 20 is equal to that of the liquid crystal display unit shown in FIG. 1, the detailed description thereof will be omitted.

The light diffusion sheet 14 comprises a white diffusion sheet without the directivity or a light diffusion reflecting plate with the directivity such as the reflection plate having micro-irregularities. The light diffusion sheet 14 is provided on the lower surface (the other surface) of the light guide plate 12, with an air layer 16 therebetween. The light diffusion sheet 14 may be slightly inclined.

In case where the light diffusion sheet 14 is provided on the lower surface of the light guide plate 12 as mentioned above, it is preferable that a reflection film or a diffusion white pigment layer be made by forming the metal material having high reflectivity such as aluminum or silver on the inner surface 18a of the holding member 18 by using either the sputtering method or the vapor depositing method, thereby applying the light reflection characteristics.

(Second Example of the Diffusive Reflector)

Next, a second example of the diffusive reflector included in the backlight device according to any one of the aforementioned embodiments will be explained.

The diffusive reflector of the second example is different from the diffusive reflector 15 of the first embodiment (the diffusive reflector of the first example) in the inner shape of the concave portions of micro-irregularities formed in the diffusive reflector.

Figure 14A:
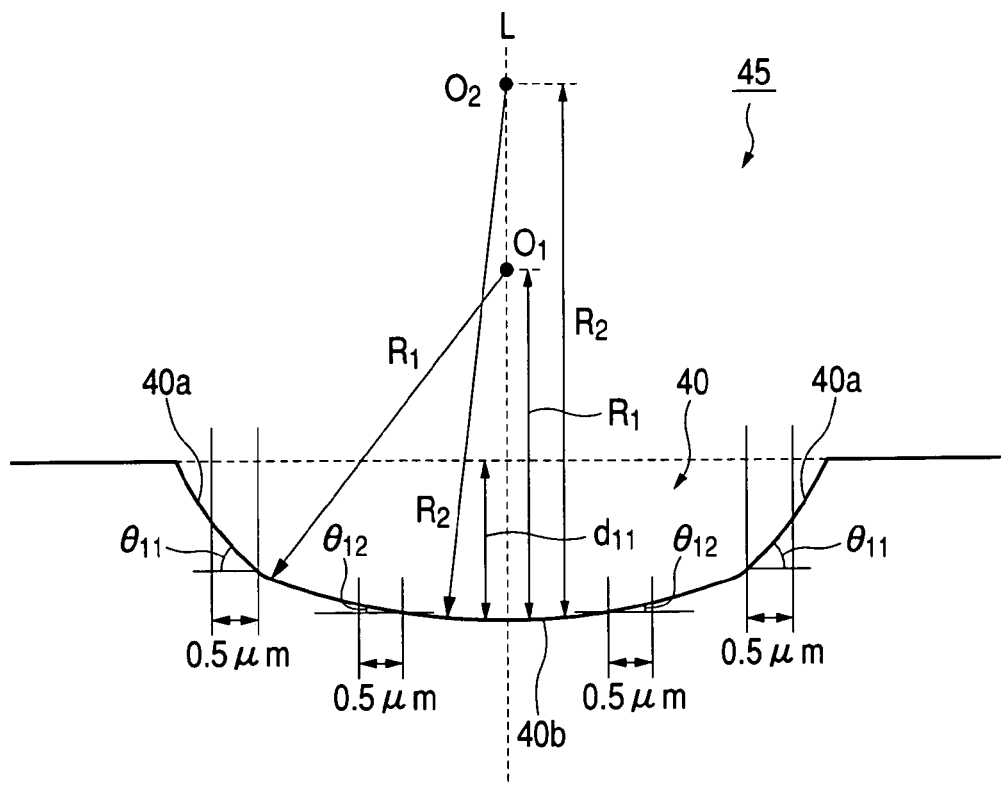
FIGS. 14a and 14b illustrate the cross-sectional and plan views, respectively.
Figure 14B:
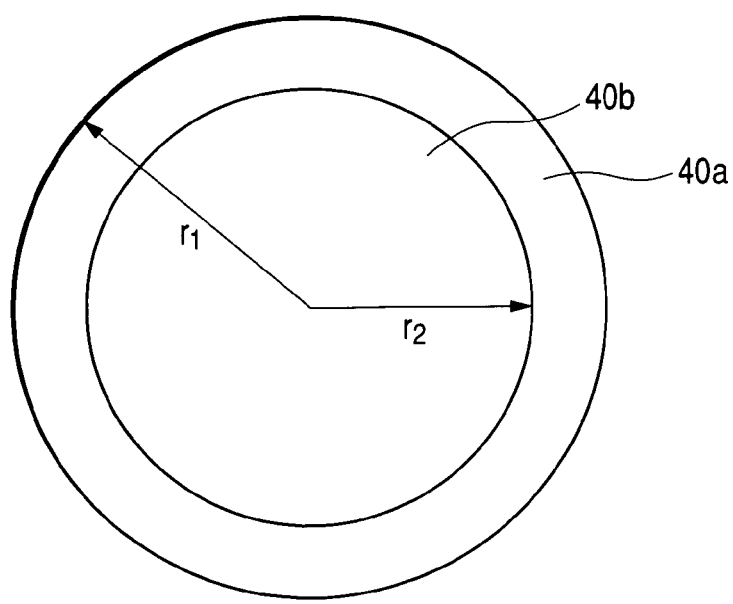

FIG. 14 shows any one of a plurality of concave portions 40 forming the micro-irregularities formed in the diffusive reflector 45 of the second example, FIG. 14A is the cross sectional view of any one of the plurality of concave portions 40, and FIG. 14B is the plan view thereof.

As shown in this figure, the inner surface of the respective concave portion 40 is composed of the surface of which portions of spheres having different radii are continuous, that is, the surface of which peripheral frame curved-surface 40a and a bottom curved-surface 40b surrounded by the peripheral frame curved-surface 40a which are portions of two spherical surfaces having different radii are connected to each other. The peripheral frame curved-surface 40a is a portion of the spherical surface having a radius of $R_1$ centering on $O_1$. Also, the bottom curved-surface 40b is a portion of the spherical surface having a radius of $R_2$ centering on $O_2$. The normal lines of the base surface of the diffusive reflector 45 at each $O_1$, $O_2$ which are the centers of the spherical surfaces, respectively, that is, any normal line vertical to the surface in which the concave portion 40 of the reflection film is not formed is located on the same straight line L.

The radii $R_1$ and $R_2$ have relationship of $R_1 \leq R_2$ and each varies in the range of 10 μm$\leq R_1 \leq$70 μm, 20 μm$\leq R_2 \leq$100 μm. Also, in FIG. 14A, $\theta_{11}$ is an inclination angle of the peripheral frame curved-surface 40a and varies in the range of $10° \leq \theta_{11} \leq 35°$ and $-35° \leq \theta_{11} \leq -10°$. In addition, $\theta_{12}$ is an inclination angle of the bottom curved-surface 40b and varies in the range of $4° \leq \theta_{12} \leq 17°$ and $-17° \leq \theta_{12} \leq -4°$.

Further, the radius $r_1$ of the peripheral frame curved-surface 40a and the radius $r_2$ of the bottom curved-surface 40b of the concave portion 40 when observing the surface of the diffusive reflector 45 in a plan view is determined by the radii $R_1$ and $R_2$ and the inclination angles $\theta_{11}$, $\theta_{12}$, respectively.

Also, in the depth $d_{11}$ and the pitch of the concave portion 40, it is preferable that the depth $d_{11}$ be randomly set in the range of 0.1 μm to 3 μm and the pitch is randomly set in the range of 5 μm to 100 μm due to the same reason as the first embodiment.

Figure 15:
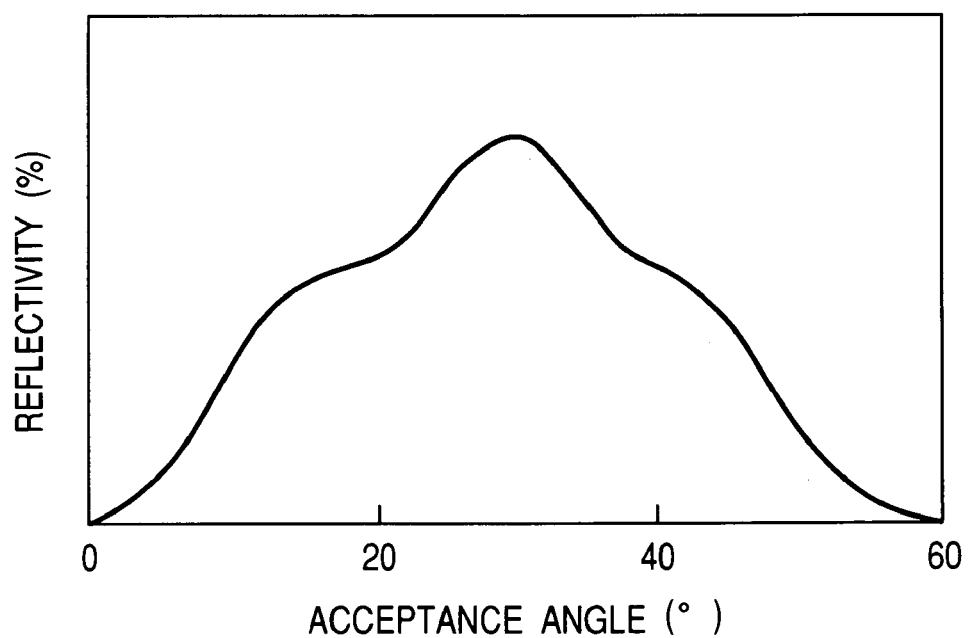
FIG. 15 is a graph showing an example of the reflection characteristics of the diffusive reflector having the concave portion shown in FIG. 14.

FIG. 15 shows the relationship between the acceptance angle (unit: °) and the brightness (reflectivity, unit: %) when the light is irradiated onto the surface of the reflection film (reflection surface) of the diffusive reflector 45 formed with a plurality of concave portions 40 at an incident angle of 30° and the acceptance angle is moved from vertical line location (0°; normal line direction) up to 60° centering on 30° which is the specular direction for the reflection surface.

As shown in this figure, according to the diffusive reflector 45 having a plurality of concave portions 40, there are the peripheral frame curved-surfaces 40a composed of portions of the spherical surfaces having the small radius in the inner surface of the concave surfaces 40 formed in the reflection surface. Accordingly, since the inclination angle having a relative high absolute value is given by the peripheral frame curved-surface, good reflectivity in the wide range of 15° to 45° can be obtained. Also, since the bottom curved-surface 40b composed of portions of the large radius is similar to the curved surface close to the flat, the ratio of the inner surface giving the inclination angle close to the zero is increased by the bottom curved-surface. As a result, when the reflectivity at the reflection surface of 30° which is the specular direction of the incident angle of 30° is set to a peak value, the reflectivity at the periphery thereof becomes increased.

According to the backlight device comprising the diffusive reflector 45 in which a plurality of concave portions 40 having the above-mentioned structure are formed, since the reflection film forming the reflection surface of the diffusive reflector 45 has the above-mentioned shape, the light emitted from the prism surface 12c of the light guide plate 12 can be efficiently reflected and diffused. Also, since the light reflected from the diffusive reflector 45 has the directivity which the reflectivity becomes increased in the specular direction, the angle of the light emitted from the emitting surface 12b of the light guide plate 12 through the diffusive reflector 45 becomes wide and the emitted efficiency at a specific emitted angle can be increased.

Further, in the backlight device comprising the diffusive reflector 45 having the above-mentioned structure, since the directivity having the high reflectivity for the specular direction can be obtained from the diffusive reflector 45, it can be controlled such that the brightness of the liquid crystal display surface becomes increased at a specific viewing range.

Also, since the reflection surface of the diffusive reflector 45 has the above-mentioned shape, the shining is prevented. And, since the range of the reflection angle at the diffusive reflector 45 is wide and to have directivity, and the liquid crystal display device which is capable of obtaining the bright display screen at a wide viewing angle and a specific observing angle can be accomplished.

(Third Example of the Diffusive Reflector)

Next, a third example of the diffusive reflector included in the backlight device according to any one of the aforementioned embodiments will be explained.

The diffusive reflector of the third example is different from the diffusive reflector 15 of the first embodiment (the diffusive reflector of the first example) in the inner shape of the concave portion of the micro-irregularities formed in the diffusive reflector.

Figure 16A:
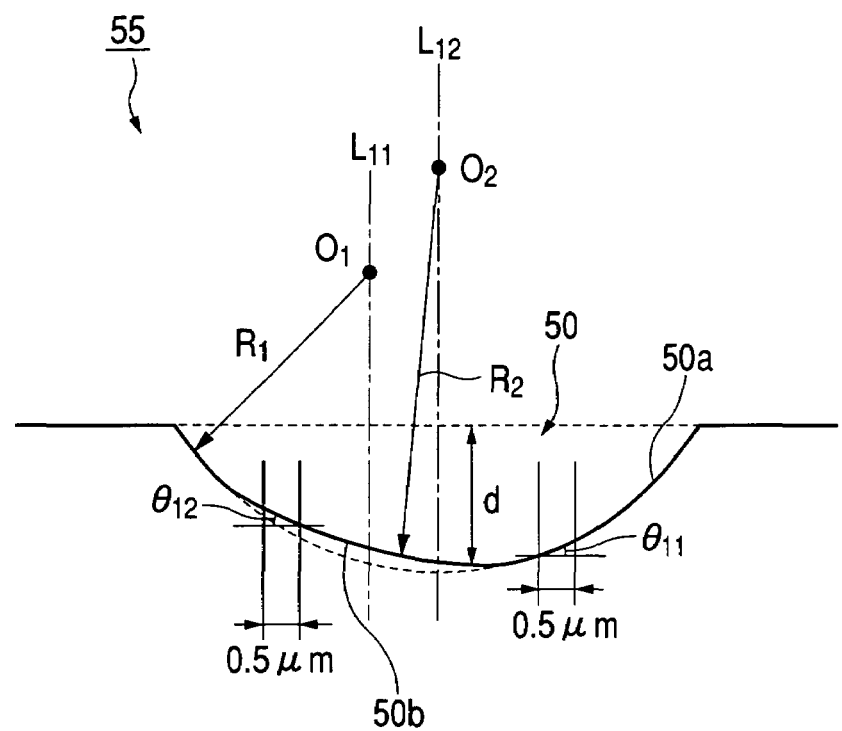
FIGS. 16a and 16b illustrate the cross-sectional and plan views, respectively.
Figure 16B:
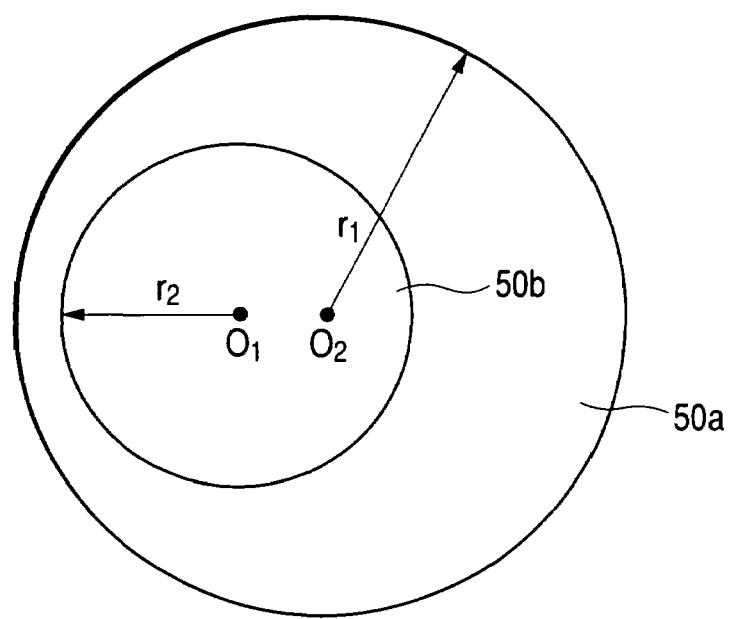

FIG. 16 shows any one of a plurality of concave portions 50 comprising the micro-irregularities formed in the diffusive reflector 55 of the third example, FIG. 16A is the cross sectional view of any one of the plurality of concave portions 50, and FIG. 16B is the plan view thereof.

As shown in Figure, the inner surface of the respective concave portion 50 is composed of a surface connecting peripheral frame curved-surfaces 50a and a bottom curved-surface 50b surrounded by the peripheral frame curved-surface 50a which are portions of two spherical surface each having different radii. The peripheral frame curved-surface 50a is a portion of the spherical surface having a radius of $R_1$ centering on $O_1$. Also, the bottom curved-surface 50b is a portion of the spherical surface having a radius of $R_2$ centering on $O_2$. The normal lines of the base surface of the diffusive reflector 55 at $O_1$, $O_2$ which are the centers of the spherical surface are located on the straight lines $L_{11}$, $L_{12}$, respectively.

The radii $R_1$ and $R_2$ have relationship of $R_1 < R_2$ and each varies in the range of 10 μm$\leq R_1 \leq$70 μm, 20 μm $\leq R_2 \leq$100 μm. Also, in FIG. 16A, $\theta_{11}$ is an inclination angle of the peripheral frame curved-surface 50a and varies in the range of $10° \leq \theta_{11} \leq 35°$ and $-35° \leq \theta_{11} \leq -10°$. In addition, $\theta_{12}$ is an inclination angle of the bottom curved-surface 40b and varies in the range of $4° \leq \theta_{12} \leq 17°$ and $-17° \leq \theta_{12} \leq -4°$.

Further, the radius $r_1$ of the peripheral frame curved-surface 50a and the radius $r_2$ of the bottom curved-surface 50b of the concave portion 50s when observing the surface of the diffusive reflector 55 in a plan view are determined by the radii $R_1$ and $R_2$ and the inclination angles $\theta_{11}$, $\theta_{12}$, respectively.

Also, in the depth d and the pitch of the concave portion 50, it is preferable that the depth d be randomly set in the range of 0.1 μm to 3 μm and the pitch is randomly set in the range of 5 μm to 100 μm due to the same reason as the first embodiment.

Figure 17:
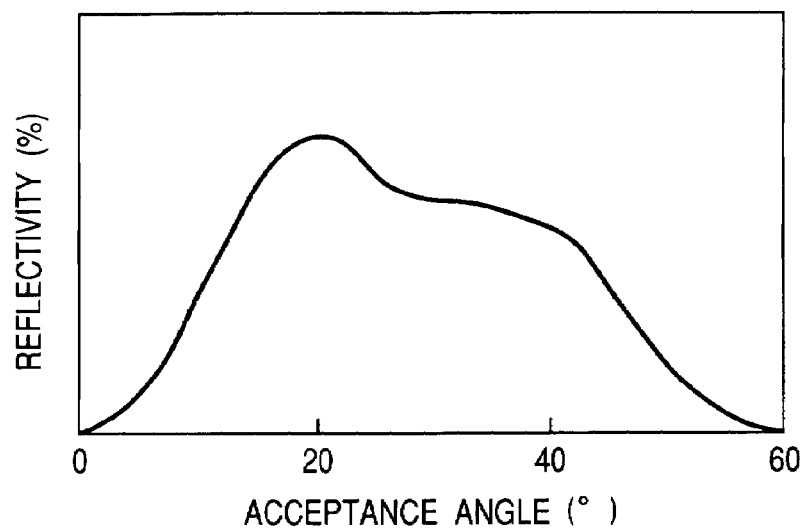
FIG. 17 is a graph showing an example of the reflection characteristics of the diffusive reflector having the concave portion shown in FIG. 16.

FIG. 17 shows the relationship between the acceptance angle (unit: °) and the brightness (reflectivity, unit: %) when the light is irradiated onto the reflection surface of the diffusive reflector 55 formed with a plurality of the above concave portions 40 at an incident angle of 30° (irradiated from the right direction in FIG. 16) and when the acceptance angle changes from vertical line location (0°; normal line direction) to 60° centering on 30° which is the specular direction for the reflection surface.

As shown in this figure, according to the diffusive reflector 55 of the third example, there is the peripheral frame curved-surface 50a composed of portions of the spherical surface having the small radius in the inner surface of the concave surface 50 formed in the reflection surface. Accordingly, since the inclination angle having a relative high absolute value is given by this peripheral frame curved-surface, good reflectivity in the wide range of 15° to 45° can be obtained. Also, since the bottom curved-surface 50b composed of portions of the spherical surface having the large radius is similar to the curved surface close to the flat surface, the ratio of the inner surface giving the inclination angle close to the zero is increased by the bottom curved-surface. As a result, when the reflectivity at the reflection angle of 30° which is the specular direction of the incident angle of 30° is set to a peak value, the reflectivity at the periphery thereof becomes increased. Accordingly, in this case, the propagating direction of the light reflected from the reflection surface of the diffusive reflector 55 is shifted to the direction of the acceptance angle 0°, rather than to the specular direction.

On the contrary, in a case where the light is introduced from the left direction in FIG. 16, the propagating direction of the reflected light is shifted to the direction of the base surface rather than to the specular direction.

According to the backlight device comprising the diffusive reflector 55 in which a plurality of concave portions 50 having the above-mentioned structure is formed, since the reflection film forming the reflection surface of the diffusive reflector 55 has the above-mentioned shape, the light emitted from the prism surface 12c of the light guide plate 12 can be efficiently reflected and diffused. Also, since the light reflected from the diffusive reflector 55 has the directivity in which the reflectivity becomes increased in the specific direction, the emitting angle of the light emitted from the emitting surface of the backlight device through the diffusive reflector 55 becomes wide and the emitting efficiency at a specific emitting angle can be increased.

Further, in this example, since the directivity having the high reflectivity in a specific direction can be obtained from the diffusive reflector 55 of the aforementioned backlight, it can be controlled such that the brightness of the liquid crystal display surface becomes increased at a specific viewing range.

(Fourth Example of the Diffusive Reflector)

Next, the fourth example of the diffusive reflector included in the backlight device according to any one of the embodiments will be explained.

The diffusive reflector of the fourth example is largely different from the diffusive reflector 15 of the first embodiment (the diffusive reflector of the first example), in the inner shape of the concave portion of the micro-irregularities formed in the diffusive reflector.

Figure 18:
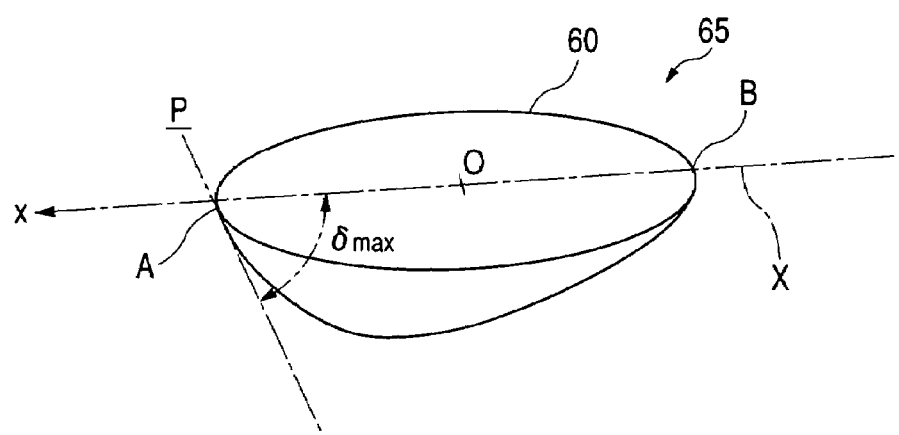
FIG. 18 is a perspective view of a concave portion of a fourth example of the diffusive reflector included in the backlight device related to the present invention.
Figure 19:
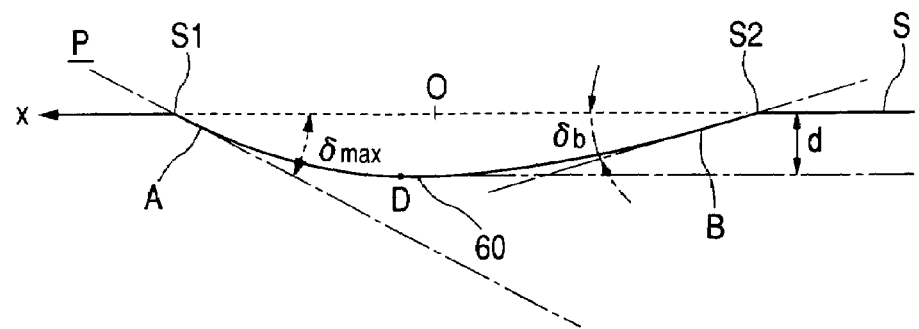
FIG. 19 is a cross sectional view along X-axis in FIG. 18.

FIG. 18 is a perspective view of any one of a plurality of concave portions 60 comprising the micro-irregularities formed in the diffusive reflector 65 of the fourth example, and FIG. 19 is a cross sectional view of a specific vertical section X passing through the deepest point of the concave portion 60. At the specific vertical surface X of the concave portion 60, the inner shape of the concave portion 60 is composed of a first curve A from one periphery portion S1 of the concave portion 60 to the deepest point D and a second curve B from the deepest point D of the concave portion to the other periphery S2 in connection with the fist curve A. The inclination angle for the base surface S becomes zero at the deepest point D, and then these curves are connected with each other.

Here, 'inclination angle' is an angle for the horizontal surface of the tangent line of any portion of the inner surface of the concave portion at a specific vertical surface (here, the base surface S in which the concave portions are not formed).

The inclination angle of the base surface S of the first curve A is steeper than that of the second curve D, and the deepest point D is in the location deviated from the center O of the concave portion 3 in the x direction. That is, the absolute average value of the inclination angle of the base surface S of the first curve A is larger than that of the base surface S of the second curve B. The inclination angle of the base surface S of the first curve A at a plurality of concave portions 60 formed in the surface of the diffusive reflector is irregularly scattered in the range of 1° to 89°. The absolute average value of the inclination angle of the base surface S of the second curve B at the concave portions 60 is irregularly scattered in the range of 0.5° to 88°.

Since the inclination angles of both curves are slowly changed, the maximum inclination angle δmax (absolute value) of the first curve A is larger than the maximum inclination angle δb (absolute value) of the second curve B. The inclination angle of the base surface of the deepest point D on which the first curve A is contacted with the second curve B is zero, and the first curve A of which the inclination angle is a negative value and the second curve B of which the slope angle is a positive value are slowly continuous.

Each maximum inclination angle δmax at a plurality of concave portions 60 formed in the surface of the diffusive reflector 65 is irregularly scattered in the range of 2° to 90°, but the maximum inclination angle δmax at a plurality of concave portions is irregularly distributed in the range of 4° to 35°.

Further, the concave portion 60 has a single minimum point D thereon (the point on the curve of which the inclination angle becomes zero). And, the distance between the minimum point D and the base surface S forms the depth D of the concave portions 60, and the depths d are randomly distributed in the range of 0.1 μm to 3 μm with respect to the concave portion 60.

Also, in this embodiment, the respective specific vertical sections X of the plurality of concave portions 60 is in the same direction. Further, the first curve A is formed so as to be oriented in a single direction. That is in all the concave portions, the x direction indicated by the arrow in FIGS. 18 and 19 is directed in the same direction.

In the diffusive reflector 65 in which the plurality of concave portions 60 are formed, since the first curve A at the plurality of concave portions 60 is oriented in a single direction, the reflected light of the obliquely-incident light from the upper portion of the x direction (the side of the first curve A) in FIG. 19 with respect to the diffusive reflector 65 is shifted to the angle smaller than the normal line direction of the base surface S rather than to the specular direction.

On the contrary, the reflected light of the obliquely-incident light from the upper portion of the direction opposite to the x direction (the side of the second curve B) in FIG. 19 with respect to the diffusive reflector 65 is shifted to the angle smaller than the surface of the base surface S, rather than the specular direction.

Accordingly, since the reflectivity of the reflected direction by the surface around the second curve B is increased as the total reflection characteristics at a specific vertical section X, the reflection characteristics of which the reflection efficiency at a specific direction is selectively improved can be obtained.

For example, the relationship between the acceptance angle (unit: °) and the brightness (reflectivity, unit: %) when the light is irradiated onto the reflection surface of the diffusive reflector 65 formed with a plurality of concave portions 60 at an incident angle of 30° from the x direction and the acceptance angle changes from vertical line location (0°; normal line direction) up to 60° centering on 30° which is the specular direction for the reflection surface is similar to that in the third embodiment. That is, the reflectivity at the reflection angle smaller than 30° which is the specular direction of the incident angle 30° is most increased, the reflectivity at the periphery thereof becomes increased when setting the direction as the peak.

According to the backlight device comprising the diffusive reflector 65 in which a plurality of concave portions 60 having the above-mentioned structure are formed, since the reflection film forming the reflection surface of the diffusive reflector 65 has the above-mentioned shape, the light emitted from the prism surface 12c of the light guide plate 12 can be efficiently reflected and diffused. Also, since the light reflected from the diffusive reflector 65 has the direction which the reflectivity becomes increased in the specific direction, the emitting angle of the light emitted from the emitting surface of the backlight device through the diffusive reflector 65 becomes wide and the emitting efficiency at a specific emitting angle can be increased.

(Fifth Example of the Diffusive Reflector)

Next, the fifth example of the diffusive reflector included in the backlight device according to any one of the aforementioned embodiments will be explained.

The diffusive reflector of the fifth example is different from the diffusive reflector 15 of the first embodiment (the diffusive reflector of the first example), in the inner shape of the concave portion of the micro-irregularities formed in the diffusive reflector.

Figure 20:
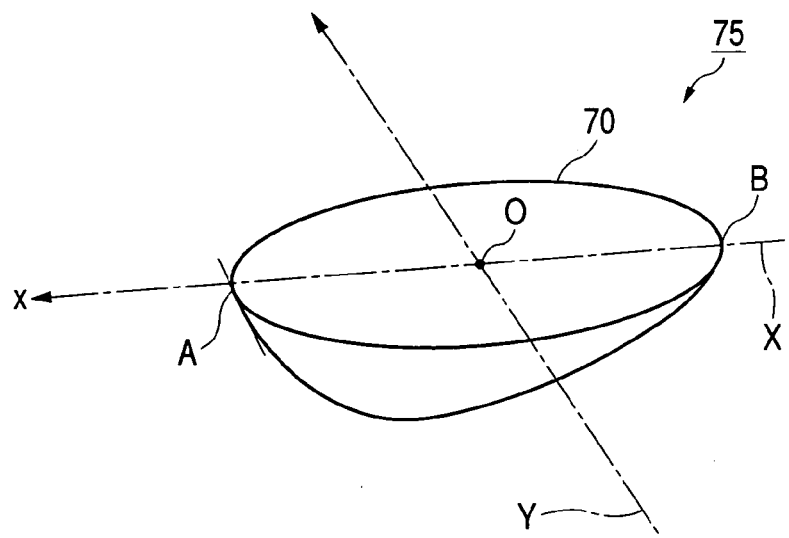
FIG. 20 is a perspective view of a concave portion of a fifth example of the diffusive reflector included in the backlight device related to the present invention.
Figure 21:
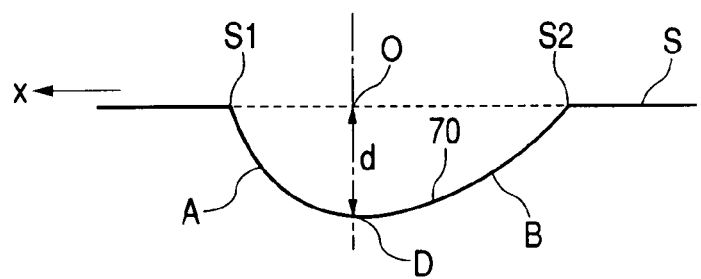
FIG. 21 is a sectional view along the X-axis in FIG. 20.
Figure 22:
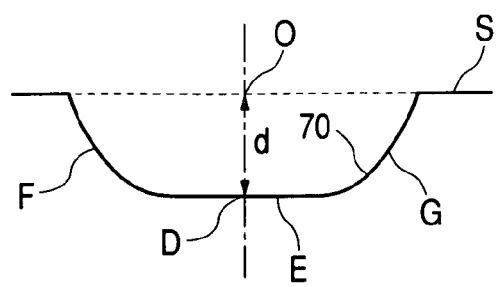
FIG. 22 is a sectional view along the Y-axis in FIG. 20.

FIGS. 20 to 22 shows the inner shape of any one of a plurality of concave portions 70 comprising the micro-irregularities formed in the diffusive reflector 75 of the fifth example.

FIG. 20 is a perspective view of the concave portion 70, FIG. 21 is a sectional view along the X-axis (referred to as a vertical section X) of the concave portion 70, and FIG. 22 is a sectional view along the Y-axis (referred to as a vertical section Y) perpendicular to the X-axis of the concave portion 70.

As shown in FIG. 21, the inner shape of the concave portion 70 at the vertical section X is composed of a first curve A from one periphery portion S1 of the concave portion 70 to the deepest point D and a second curve B from the deepest point D of the concave portion to the other periphery S2 in connection with the fist curve A. In the first forward leaning curve A and the second backward leaning curve B in FIG. 21, the inclination angle with respect to the base surface S become zero at the deepest point D, and then these curves are connected with each other.

Here, 'inclination angle' is the angle with respect to the horizontal surface of the tangent line of any portion of the inner surface of the concave portion at a specific vertical section (here, the base surface S in which the concave portion is not formed).

The inclination angle with respect to the base surface S of the first curve A is steeper than that of the second curve B, and the deepest point D is in the location deviated to the direction (x direction) toward the peripheral frame along the X-axis from the center O of the concave portions 70. That is, the absolute average value of the inclination angle of the first curve A is larger than that of the second curve B. The absolute average value of the inclination angle of the first curve A at a plurality of concave portions 70 formed in the surface of the diffusive reflector is irregularly distributed in the range of 2–90°. The absolute average value of the inclination angle of the second curve B at a plurality of concave portions 70 is irregularly distributed in the range of 1–89°.

On the other hand, as shown in FIG. 22, the inner shape at the vertical section Y of the concave portion 70 is substantially uniform from right to left with respect to the center O of the concave portion 70, and the periphery of the deepest point D of the concave portion 70 is composed of a shallow curve E having a large radius of the curvature, that is, close to the straight line. Also, the right and left of the shallow line E are composed of deep curves F, G having a small radius of the curvature, the absolute value of the inclination angle of the shallow curve E at the plurality of concave 70 formed in the surface of the diffusive reflector 75 is approximately not more than 10°. In addition, the absolute values of the inclination angles of the deep curves F, g at the plurality of concave portions 70 are irregularly distributed, for example, in the range of 2 to 90°. Further, the depth d of the deepest point D is irregularly distributed in the range of 0.1 $\mu$m to 3 $\mu$m.

In this example, the plurality of concave portions 70 formed on the surface of the diffusive reflector 75 is oriented such that the section directions applying to the shape of the vertical section X become all the same direction, the section directions applying to the shape of the vertical section Y become all the same direction, and the directions toward the periphery portion S1 passing through the first curve A from the deepest point D are all the same direction. That is, all of the concave portions 70 formed in the surface of the diffusive reflector are formed such that the x direction indicated by the arrows in FIGS. 21 and 22 is directed to the same direction.

According to this embodiment, since the directions of the concave portions 70 formed on the surface of the diffusive reflector 75 are equal and the directions toward the periphery portion S1 passing through the first curve A from the deepest point D are equal, the reflected light of the obliquely-incident light from the upper side of the x direction (the direction of the first curve A) in FIGS. 20 and 21 with respect to the diffusive reflector 75 is shifted to the normal line direction of the base surface S rather than to the specular direction.

On the contrary, the reflected light of the obliquely incident-light from the upper side of the direction opposite to the x direction (the direction of the second curve B) in FIGS. 20 and 21 is shifted to the surface direction of the base surface S rather than to the specular direction.

Also, since the vertical section Y perpendicular to the vertical section X is formed with a shallow curve E having a large radius of curvature and deep curves F, G each having a small radius of the curvature on both sides of the shallow curve E, the reflectivity of the specular direction becomes increased at the reflection surface of the diffusive reflector 75.

Figure 23:
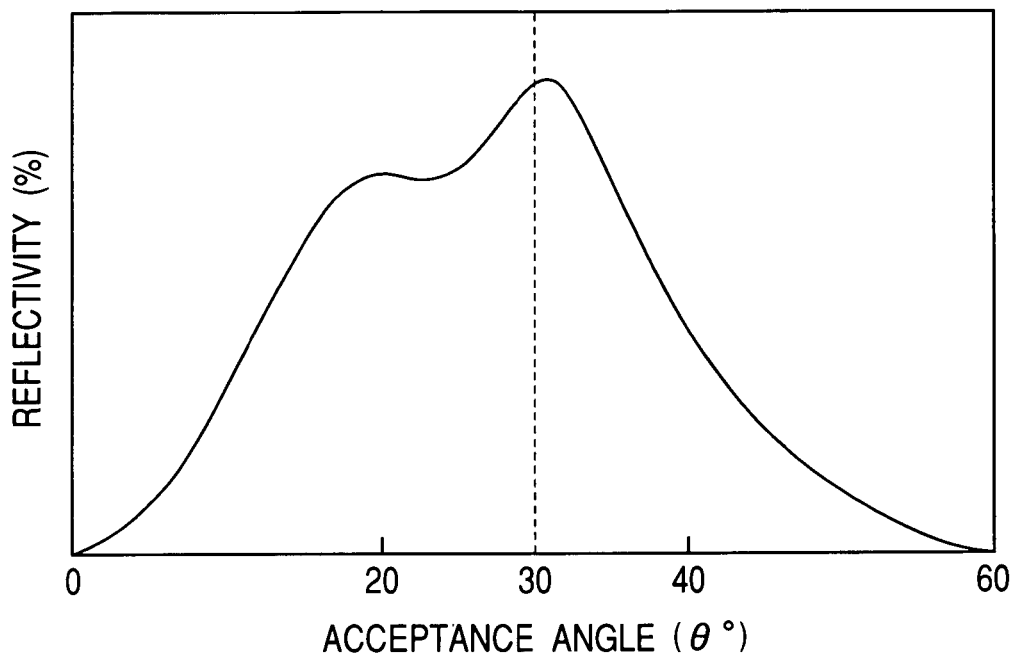
FIG. 23 is a graph showing an example of the reflection characteristics of the diffusive reflector having the concave portion shown in FIG. 20.
Figure 24:
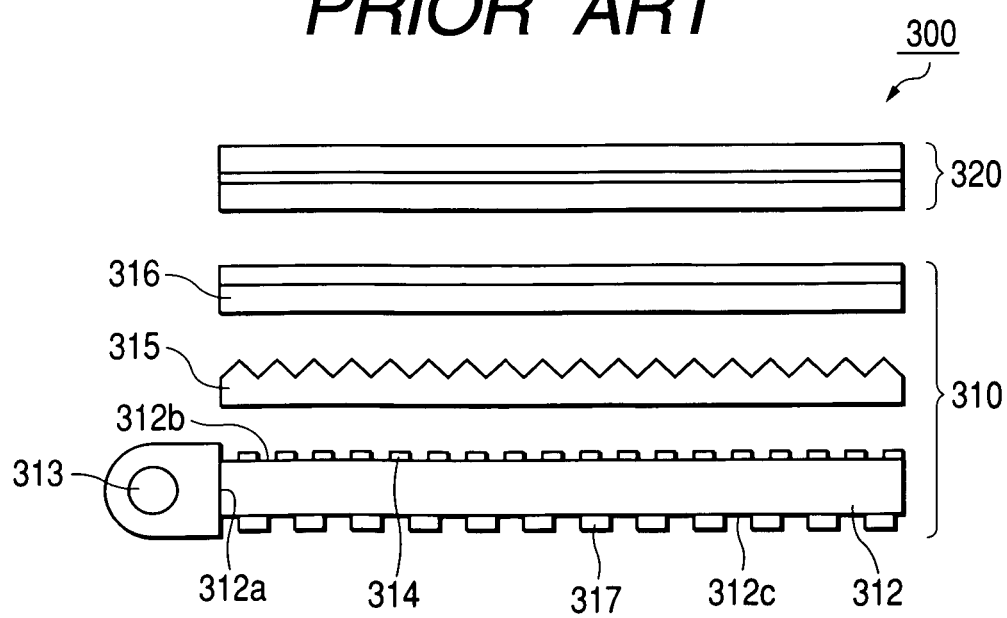
FIG. 24 is a schematic cross sectional view of an example of a conventional passive-type liquid crystal display device.
Figure 25:
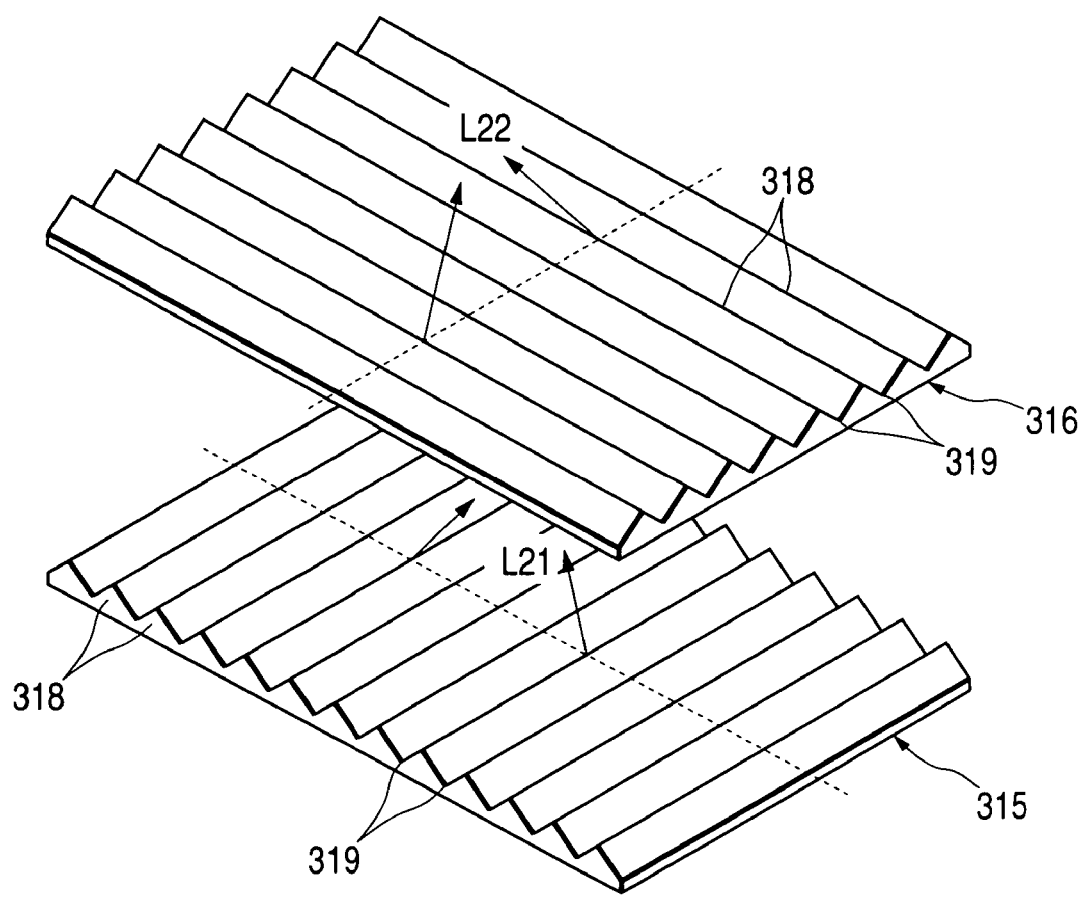
FIG. 25 is a perspective view of two prism sheets included in the conventional liquid crystal display device shown in FIG. 24.

As a result, as shown in FIG. 23, the reflection characteristics in which the reflected light is focused in a specific direction while sufficiently ensuring the reflectivity of the specular direction as the total reflection characteristics at the vertical section X can be accomplished. FIG. 23 shows the relationship between the viewing angle ($\theta$°) and the brightness (reflectivity) when the light is irradiated onto the diffusive reflector 75 formed with a plurality of concave portions 70 at an incident angle of 30° from the direction inclined to the x direction rather than the normal line direction of the base surface S and the viewing angle changes from vertical line location (0°) to 60° centering on 30° which is the specular direction with respect to the base surface S. In the reflection characteristics shown in this graph, the integral value of the reflectivity having the reflection angle range smaller than the specular angle of 30° is larger than the integral value of the reflectivity having reflection angle range larger than the specular angle and the reflection direction is shifted to the normal line rather than to the specular direction.

According to the backlight device comprising the diffusive reflector 75 in which a plurality of concave portions 70 having the above-mentioned structure are formed, since the reflection film forming the reflection surface of the diffusive reflector 75 has the above-mentioned shape, the light emitted from the prism surface 12c of the light guide plate 12 can be efficiently reflected and diffused. Also, since the light reflected from the diffusive reflector 75 has the directivity in which the reflectivity becomes increased in the specific direction, the emitted angle of the light emitted from the emitting surface of the backlight device through the diffusive reflector 75 becomes wide and the emitted efficiency at a specific emitted angle can be increased.

Also, since the directivity having the high reflectivity in a specific direction can be obtained by the diffusive reflector 75 of the backlight device as mentioned above, the brightness of the liquid crystal display surface becomes high at the specific viewing range.

In addition, in this embodiment, although the case where any one of the concave portions of the first to fifth examples is employed as the plurality of concave portions comprising the micro-irregularities of the diffusive, reflector included in the backlight device related to the present invention is explained, a plurality of the convex portions comprising the micro-irregularities of the diffusive reflector included in the backlight device related to the present invention can be employed, if any one of the concave portions of the first to fifth examples is formed such that the concave portion is directed to the side of the substrate 15a (opposite side of the light guide plate 12).

Also, the technical field of the present invention is not limited to the embodiments, and various changes may be made therein without departing from the spirit and scope of the present invention.

For example, although the base of the diffusive reflector is composed of the substrate, the organic film, and the reflecting film in each example, it is not limited to that. For example, the base can be composed of a metal plate having high reflectivity such as an aluminum plate and the diffusive reflector can be formed by punching the whole surface using the front end (concave portion) of the punch to form a plurality of concave portions each having a predetermined depth.

Also, the present invention is not limited to the passive-type liquid crystal display device, and can be applied to an active matrix type liquid crystal display device.

In addition, the present invention is not limited to the transmissive-type liquid crystal display device, and can be applied to a semi-transmissive-type liquid crystal display device.

As mentioned above, according to the backlight device of the present invention, since one light guide plate serves to both guide light and reflect light and the light guide plate can use the reflected light component as well as the transmitted light component as the illumination light among the light components incident on the wedge-shaped grooves, the illumination area can be uniformly and brightly illuminated, the number of components can be reduced, the structure thereof can be made simply and thin, and the manufacturing cost thereof can be reduced.

Also, according to the liquid crystal display device of the present invention, since the liquid crystal display device comprises the backlight device on the back surface of the liquid crystal display unit, high brightness and excellent display quality can be obtained. In addition, the thin liquid crystal display device can be manufactured at low cost.

What is claimed is:

1. A backlight device, comprising:
a light source, and
a light guide plate having an end surface adjacent to the light source and an emitting surface;
wherein light components from the light source are introduced into the light guide plate through the end surface of the light guide plate to emit light from the emitting surface as illuminating light;
wherein the emitting surface has a plurality of wedge-shaped grooves in stripes and a light diffusion surface having micro-protrusions formed between adjacent wedge-shaped grooves;
wherein light components incident on the light diffusion surface form a first transmitting light component diffusing and emitting from the emitting surface of the light guide plate as illuminating light; and
wherein light components incident on the wedge-shaped grooves are split into a second transmitting light component diffusing and emitting from the emitting surface of the light guide plate as illuminating light and a reflected light component is re-introduced into the wedge-shaped grooves or the light diffusion surface so as to be emitted from the emitting surface of the light guide plate as illuminating light.

2. A backlight device according to claim 1, wherein an extended direction of the wedge-shaped grooves formed in the emitting surface of the light guide plate is parallel to the end surface of the light guide plate.

3. A backlight device according to claim 1, wherein an extended direction of the micro-protrusions formed in the emitting surface of the light guide plate is either parallel or perpendicular to the end surface of the light guide plate.

4. A backlight device according to claim 1,
wherein the depth of a first wedge-shaped groove is deeper than the depth of a second wedge-shaped groove closer to the light source than the first wedge-shaped groove, or
wherein the distance between a first pair of adjacent wedge-shaped grooves is shorter than the distance between a second pair of adjacent wedge-shaped grooves closer to the light source than the first pair of adjacent wedge-shape grooves.

5. A backlight device according to claim 4, wherein the depth of a first wedge-shaped groove is deeper than the depth of a second wedge-shaped groove closer to the light source than the first wedge-shaped groove.

6. A backlight device according to claim 4, wherein the distance between a first pair of adjacent wedge-shaped grooves is shorter than the distance between a second pair of adjacent wedge-shaped grooves closer to the light source than the first pair of adjacent wedge-shape grooves.

7. A backlight device according to claim 1, comprising a diffusive reflector comprising micro-irregularities on a base surface of the diffusive reflector reflecting light therefrom, wherein the base surface is directed to a surface of the light guide plate opposite the emitting surface.

8. A backlight device according to claim 1, comprising a light directivity adjusting sheet formed on the emitting surface of the light guide plate, the light directivity sheet having a base body comprising a plurality of pyramid-shaped bodies having tips directed opposite to the light guide plate,
   wherein the light directivity adjusting sheet controls directivities of transmitted light components in at least two different directions among the light components emitted from the emitting surface of the light guide plate or transmitted through the light directivity adjusting sheet.

9. A backlight device according to claim 8, comprising micro-irregularities formed on the surface of the light directivity adjusting sheet facing the emitting surface of the light guide plate so as to diffuse light emitted from the emitting surface.

10. A backlight device according to claim 1, wherein a first thickness of the light guide plate at a first distance from the light source is less than a second thickness of the light guide plate at a second distance from the light source, wherein the first distance is farther from the light source than the second distance.

11. A backlight device according to claim 1, wherein the light source comprises a middle light guide body arranged along the end surface of the light guide plate and point light sources positioned on the ends of the middle light guide body in a longitudinal direction.

12. A liquid crystal display device, comprising:
   a backlight device according to claim 1, and
   a liquid crystal display unit illuminated by the backlight device.

* * * * *